US012662857B2

(12) United States Patent
Harris et al.

(10) Patent No.: US 12,662,857 B2
(45) Date of Patent: Jun. 23, 2026

(54) RECREATIONAL VEHICLE DOOR LATCH ENGAGEMENT SYSTEMS

(71) Applicant: RVLock & CO, LLC, Wellsville, UT (US)

(72) Inventors: Gregory Cade Harris, Wellsville, UT (US); Carson Matthew Humphreys, Logan, UT (US); Luke Erik Pearson, Logan, UT (US)

(73) Assignee: RVLOCK & CO, LLC, Wellsville, UT (US)

( * ) Notice: Subject to any disclaimer, the term of this patent is extended or adjusted under 35 U.S.C. 154(b) by 163 days.

(21) Appl. No.: 18/478,629

(22) Filed: Sep. 29, 2023

(65) Prior Publication Data

US 2025/0109619 A1 Apr. 3, 2025

(51) Int. Cl.
*E05C 3/16* (2006.01)
*E05B 83/44* (2014.01)

(52) U.S. Cl.
CPC .............. *E05C 3/165* (2013.01); *E05B 83/44* (2013.01)

(58) Field of Classification Search
CPC .......... E05C 3/165; E05C 9/08; E05C 9/1875; E05C 9/20; E05C 21/02; E05C 2009/1816; E05B 83/44; E05B 79/16; E05B 79/12
USPC .................................................. 292/200, 216
See application file for complete search history.

(56) References Cited

U.S. PATENT DOCUMENTS

| | | | | |
|---|---|---|---|---|
| 4,683,741 | A | 8/1987 | Fields | |
| 4,967,305 | A | 10/1990 | Murrer et al. | |
| 5,058,937 | A * | 10/1991 | Miehe | E05C 1/145 292/DIG. 31 |
| 5,127,686 | A * | 7/1992 | Gleason | E05B 5/00 292/216 |
| 5,697,238 | A | 12/1997 | Oike | |
| 6,290,268 | B1 * | 9/2001 | Cohen | E05B 63/14 292/196 |
| 6,604,393 | B2 | 8/2003 | Larsen et al. | |
| 6,701,761 | B1 | 3/2004 | Chang et al. | |
| 7,236,085 | B1 | 6/2007 | Aronson et al. | |
| 7,874,972 | B2 | 1/2011 | Hayasaka et al. | |

(Continued)

FOREIGN PATENT DOCUMENTS

| | | | | | |
|---|---|---|---|---|---|
| DE | 2629332 | A1 | 1/1978 | | |
| DE | 202007014504 | U1 * | 4/2009 | | E05C 9/043 |

(Continued)

*Primary Examiner* — Kristina R Fulton
*Assistant Examiner* — James Edward Ignaczewski
(74) *Attorney, Agent, or Firm* — Workman Nydegger

(57) ABSTRACT

A door handle assembly comprises a handle and a release plate in mechanical communication with the handle such that actuation of the handle causes rotation of the release plate. The release plate defines a window configured to (i) receive a projection of a trip lever of a door latch assembly of a door such that rotation of the release plate causes rotation of the trip lever to facilitate rotation of a rotor of the door latch assembly to a disengaged position and (ii) receive and secure a door linkage rod assembly comprising a linkage rod that is connectable to a trip lever of a door latch assembly of a door such that rotation of the release plate causes actuation of the linkage rod to rotate the trip lever to facilitation rotation of a rotor of the door latch assembly to a disengaged position.

20 Claims, 36 Drawing Sheets

(56) References Cited

U.S. PATENT DOCUMENTS

| | | | | |
|---|---|---|---|---|
| 8,733,139 | B2 * | 5/2014 | Pickar | E05B 85/12<br>292/DIG. 31 |
| 9,316,029 | B2 * | 4/2016 | Hunt | F16B 2/22 |
| 9,816,299 | B2 * | 11/2017 | Pickar | E05B 5/00 |
| 12,209,444 | B2 * | 1/2025 | Zierer | E05C 1/145 |
| 2004/0040353 | A1 | 3/2004 | Yu et al. | |
| 2005/0044908 | A1 | 3/2005 | Min | |
| 2005/0179517 | A1 | 8/2005 | Harms et al. | |
| 2010/0154489 | A1 | 6/2010 | Bacon | |
| 2014/0049055 | A1 * | 2/2014 | Shih | E05C 7/00<br>292/162 |
| 2015/0279137 | A1 * | 10/2015 | Bacon | E05B 81/66<br>70/278.1 |
| 2016/0137041 | A1 * | 5/2016 | Dylewski, II | E05B 85/10<br>292/306 |
| 2018/0038139 | A1 * | 2/2018 | Zindler | E05B 83/20 |
| 2020/0048941 | A1 * | 2/2020 | Noda | E05B 83/42 |
| 2021/0032909 | A1 * | 2/2021 | Amato | E05B 83/36 |

FOREIGN PATENT DOCUMENTS

| | | | | |
|---|---|---|---|---|
| DE | 202007017248 | U1 * | 5/2009 | E05C 9/20 |
| FR | 3089242 | A1 * | 6/2020 | E05B 79/16 |
| KR | 10-0643161 | B1 | 11/2006 | |
| KR | 10-0897023 | B1 | 5/2009 | |

* cited by examiner

100

RECREATIONAL VEHICLE DOOR LATCH ENGAGEMENT SYSTEMS

BACKGROUND

A door handle provides a way for users to open and close doors, including recreational vehicle (RV) doors. Many doors of RVs (e.g., Class A or Class C RVs) include a rotary latch system with one or more latch rotors that can rotate between engaged (closed) and disengaged (open) positions. When in the engaged position, the latch rotor(s) is/are rotationally positioned to retain a striker bolt of the RV door frame to prevent opening of the RV door. When in the disengaged position, the latch rotor(s) is/are rotationally positioned to refrain from retaining the striker bolt, allowing opening of the RV door.

RV doors often include RV door handles that interface with components of rotary latch systems to facilitate actuation of the latch rotor(s) between the engaged and disengaged positions. Many RV owners replace their RV door handles for various reasons, such as to repair a broken RV door handle or to upgrade an RV door handle to a keyless entry RV door handle. However, numerous types of RV doors and rotary latch systems exist. Accordingly, RV door handle producers typically design and manufacture numerous types of RV door handles to accommodate the different types of RV doors and latch systems, resulting in significant manufacturing and design expense. Furthermore, the existence of multiple types of RV doors and rotary latch systems can make it difficult for users to identify the correct type of RV door handle to purchase and install.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

Reference will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures are not necessarily drawn to scale.

DETAILED DESCRIPTION

Figure 1:
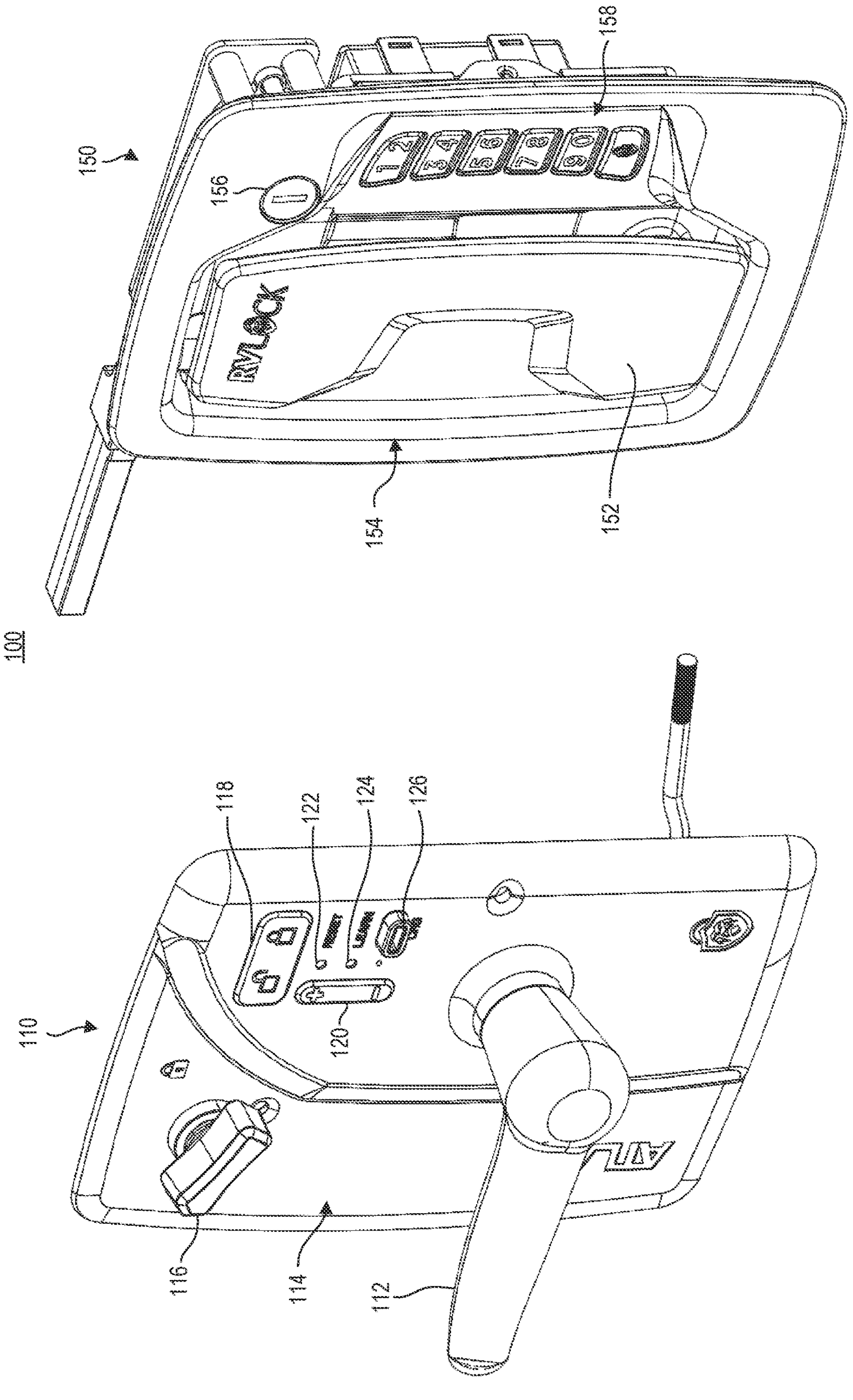
FIG. 1 illustrates a perspective view of an interior assembly and an exterior assembly of an example door handle assembly, according to implementations of the disclosed subject matter.

The disclosed subject matter relates to door handle assemblies and/or components thereof, such as RV door handle assemblies and/or components thereof.

As noted above, various types of RV doors and rotary latch systems exist (e.g., for Class A or Class C RVs), which can give rise to significant manufacturing/design expense for RV door handle producers, difficulty for users in identifying and/or installing an appropriate RV door handle replacement or upgrade, and/or other challenges.

At least some disclosed embodiments provide a door handle assembly (e.g., usable in conjunction with RV doors) that includes a release plate that is actuatable via a handle and that defines a window. In some implementations, the window is sized and shaped to receive a projection of a trip lever of a first type of door latch assembly. Actuation of the release plate (e.g., via the handle) may thus cause actuation of the trip lever, which may trigger rotation of a rotor of the first type of door latch assembly. The door handle assembly may thus be configured to accommodate the first type of door latch assembly (e.g., which utilizes a trip lever projection to interact with actuatable components of a door handle assembly).

While providing such functionality, the release plate window of the door handle assembly of the example above may be further configured to receive and secure a door linkage rod assembly. In some implementations, the door linkage rod assembly includes a linkage rod that is connectable to a trip lever of a second type of door latch assembly. Actuation of the release plate may thus cause actuation of the linkage rod, which, when connected to the trip lever, may trigger rotation of a rotor of the second type of door latch assembly. The door handle assembly may thus be configured to accommodate the second type of door latch assembly (e.g., which utilizes a trip lever that engages with a linkage rod to interact with actuatable components of a door handle assembly).

Door handle assemblies that include the features described above (and elsewhere herein) may advantageously be configurable to accommodate different door latch assembly types via simple modification prior to installation onto a door. For instance, upon acquisition of a door handle assembly that includes a release plate and a selectively removable/insertable linkage rod assembly, the user may determine whether the rotary latch assembly of their existing door utilizes (i) a trip lever projection or (ii) a linkage rod connection point to interact with door handle assemblies. If the rotary latch assembly utilizes a trip lever projection, the user may remove the linkage rod assembly from the window of the release plate (or may refrain from securing the linkage rod assembly within the window of the release plate). If the rotary latch assembly utilizes a linkage rod connection point, the user may install the linkage rod assembly on the window of the release plate (or may refrain from removing the linkage rod assembly from the window of the release plate).

By providing a single door handle assembly that is configurable to accommodate different types of door latch systems, user confusion, frustration, and/or difficulty associated with identifying and/or installing an appropriate door handle assembly may be at least partially mitigated. Furthermore, design and/or manufacturing costs for door handle producers may be significantly reduced.

Different types of door latch systems can be associated with different offset distances between the door handle and the latch edge/side of the door. For instance, rotary latch assemblies that utilize a linkage rod are commonly associated with an offset of about 2.25" to about 2.5" between the latch edge/side of the door and the closest portion of the exterior face of the door handle. Other types of rotary latch assemblies are commonly associated with smaller offsets (e.g., less than 1.5" or 1" between the latch edge/side of the door and the closest portion of the exterior face of the door handle).

At least some disclosed embodiments provide a door handle assembly locking system that enables selective changing of deadbolts (e.g., prior to installation). For instance, a locking system may include a lock actuator with a linkage bar extending therefrom. The linkage bar may extend from the lock actuator toward a deadbolt housing and insert through a guide slot in the deadbolt housing to engage with a deadbolt positioned within the deadbolt housing. The deadbolt housing may include a removal slot contiguous with the guide slot. When the linkage bar is aligned with the removal slot, the linkage bar may be removed from the guide slot through the removal slot, enabling removal, insertion, or replacement of a deadbolt within the deadbolt housing. For instance, a user may remove a deadbolt initially positioned within the deadbolt housing and replace it with a deadbolt that has a different length (e.g., a shorter or longer length), or a user may insert an appropriately sized deadbolt without removing an initially positioned deadbolt. After the desired deadbolt is positioned within the deadbolt housing, the linkage bar may be re-inserted through the removal slot to engage with the deadbolt within the deadbolt housing. After installation of the door handle assembly onto a door, the deadbolt removal slot may be occluded by portions of the door to prevent subsequent removal of the installed deadbolt.

Door handle assemblies that enable changing of deadbolts as described above (and elsewhere herein) may advantageously be configurable to accommodate different door types via simple modification prior to installation. For instance, a door handle assembly that includes a removal slot in the deadbolt housing may be provided with multiple deadbolts of different lengths. Upon acquisition of such a door handle assembly, the user may determine the appropriate deadbolt length for their system. For instance, a user may select a longer deadbolt for a door system that utilizes a linkage rod and may select a shorter deadbolt for a door system that does not utilize a linkage rod. The user may align the linkage bar with the removal slot along the guide slot of the deadbolt housing, remove the linkage bar from the deadbolt housing through the removal slot, (remove an initially positioned deadbolt) insert the selected deadbolt within the deadbolt housing, and insert the linkage bar into engagement with the selected deadbolt through the removal slot. Once the selected deadbolt is secured by the linkage bar, the user may proceed with installing the door handle assembly on the door.

By providing a single door handle assembly that is configurable to accommodate different types of deadbolts, user confusion, frustration, and/or difficulty associated with identifying and/or installing an appropriate door handle assembly may be at least partially mitigated. Furthermore, design and/or manufacturing costs for door handle producers may be significantly reduced.

Furthermore, at least some disclosed locking systems provide a simplified design, where a single lock actuator is usable to facilitate different locking modalities (e.g., deadbolt locking and handle locking). For instance, a single lock actuator may include one or more linkage bars extending therefrom. The linkage bar(s) may include multiple engagement members that engage with different locking bolts, such as a first engagement member configured to engage with a handle locking bolt and a second engagement member configured to engage with a deadbolt. Actuation of the single lock actuator may thus simultaneously facilitate deadbolt locking (or unlocking) and handle rotation locking (or unlocking).

Such functionality can facilitate simpler design/manufacturing processes and can improve the simplicity of operating the lock. For example, by implementing the dual locking features disclosed above (and elsewhere herein), a door handle assembly may omit multiple sets of locking components (e.g., key cylinders, thumb turns or other lock controls) for the multiple locking modalities present on the door handle assembly. Users may thus accomplish locking in multiple modalities within a shorter time period. Furthermore, the omission of multiple sets of locking components may improve the aesthetic characteristics of the door handle assembly.

It should be understood that although some of the disclosed embodiments describe a door handle assembly related to use in an RV, one of ordinary skill in the art could apply these methods and systems to any door assembly configured to open and/or close a door or door-like device. Additionally, it should be understood that although the term "door handle assembly" is used, this designation is not limiting of the principles disclosed herein. Alternative configurations, such as, for example, a doorknob assembly or other assemblies related to opening/closing of doors, are also contemplated by the present disclosure. One will appreciate that the directional and/or relative designations used herein (e.g., "front," "back," "right," "left," "top," "bottom," and the like) are utilized by way of illustrative example and for ease of description. The relative designations used herein may be replaced with others for different implementation contexts.

Door Latch Engagement Systems

Figure 2:
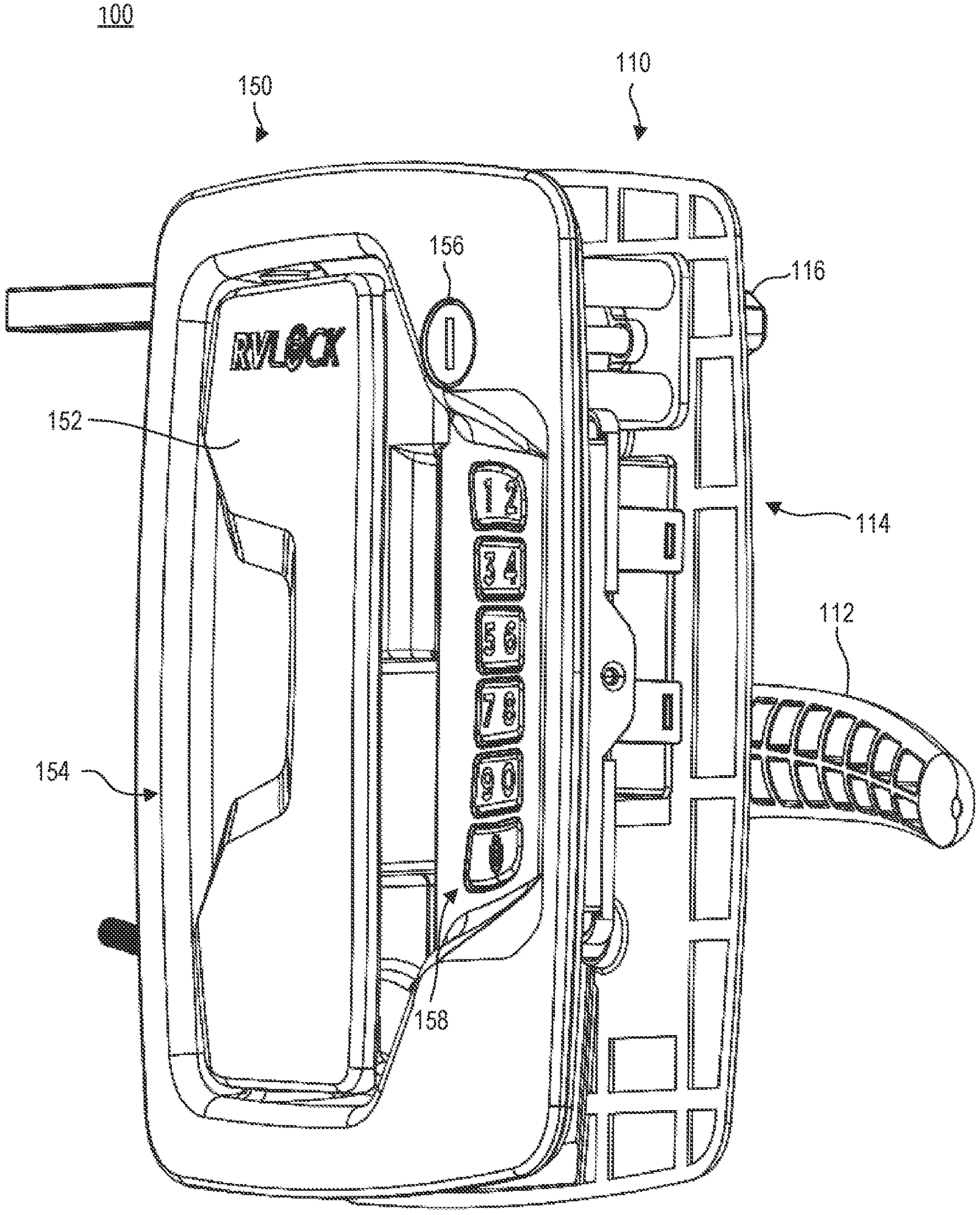
FIG. 2 illustrates a perspective view of an example door handle assembly, according to implementations of the disclosed subject matter.

FIG. 1 illustrates a perspective view of an interior assembly 110 and an exterior assembly 150 of a door handle assembly 100. FIG. 2 shows the door handle assembly 100 with the interior assembly 110 and the exterior assembly 150 assembled together. The interior assembly 110 and the exterior assembly 150 may be arranged on opposing sides of a door (e.g., an RV door) and secured together through an opening in the door.

As shown in FIGS. 1 and 2, the interior assembly 110 includes a handle 112, and the exterior assembly 150 includes a handle 152. In the example of FIGS. 1 and 2, handle 112 is an interior handle on an interior face 114 of the door handle assembly 100, and handle 152 is an exterior handle on an exterior face 154 of the door handle assembly 100. When installed on a door, the handles 112 and 152 may be utilized to facilitate opening of the door. For instance, as will be described in more detail hereinafter, the handles 112 and 152 may be utilized to cause actuation of internal features of the door handle assembly 100 to trigger rotation of rotary latch components to enable door opening and/or closing.

The door handle assembly 100 of FIGS. 1 and 2 furthermore includes various components that may facilitate locking of a door to which the door handle assembly is affixed. For instance, in the example of FIGS. 1 and 2, the door handle assembly 100 includes a thumb turn 116, lock/unlock buttons 118, a key cylinder 156, and a keypad 158, which may be utilized to facilitate locking and/or unlocking of a door to which the door handle assembly 100 is affixed. For instance, as will be described in more detail hereinafter, the thumb turn 116, the lock/unlock buttons 118, the key cylinder 156, and/or the keypad 158 may be operated to facilitate actuation of a deadbolt and/or a handle locking bolt to enable door locking and/or unlocking (e.g., two lock/unlock controls of different types may be provided on or accessible from the interior face 114, and two lock/unlock controls of different types may be provided on or accessible from the exterior face 154). Additional or alternative components/devices associated with a door handle assembly 100 may be utilized to facilitate door locking and/or unlocking as described herein, such as a key fob, remote control, smartphone and/or other devices.

Figure 29:
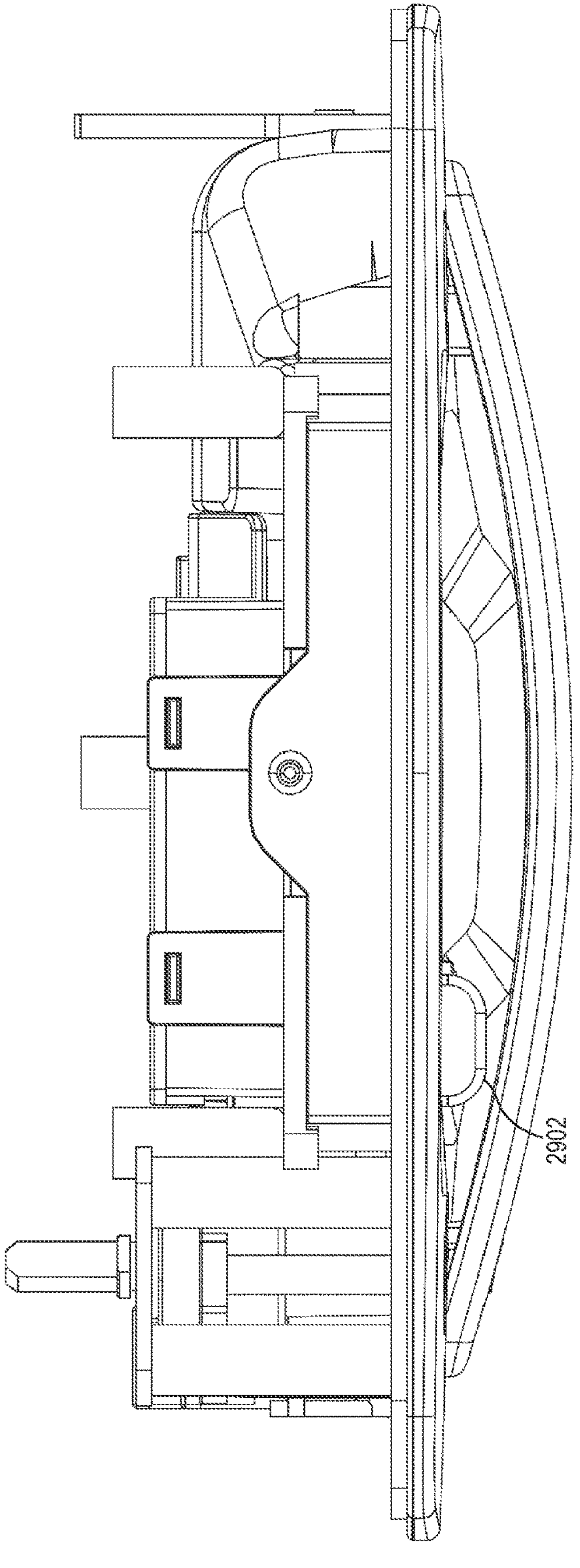
Figure 30:
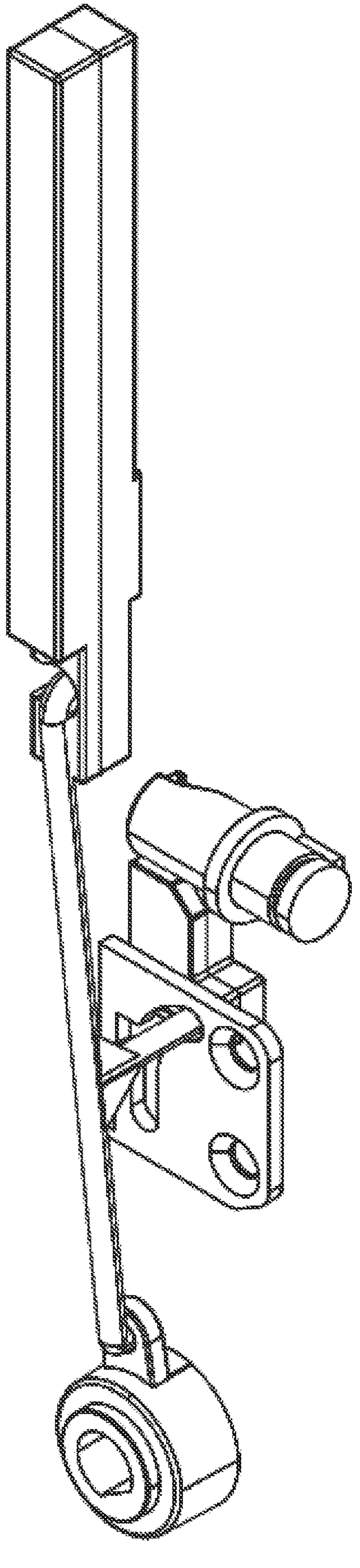
FIGS. 30 through 36 illustrate various views of locking components of a door handle assembly, according to implementations of the disclosed subject matter.
Figure 31:
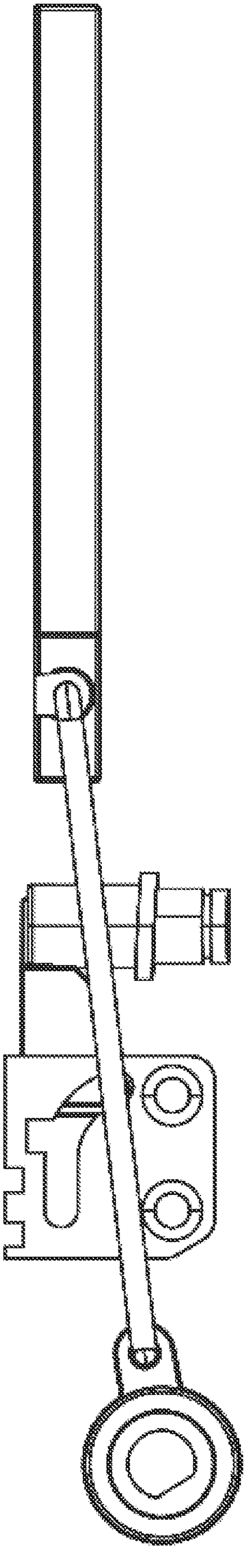
Figure 32:
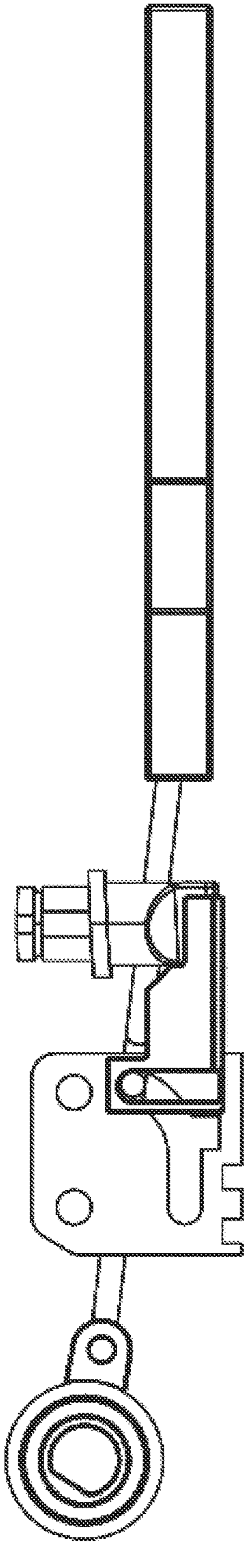
Figure 33:
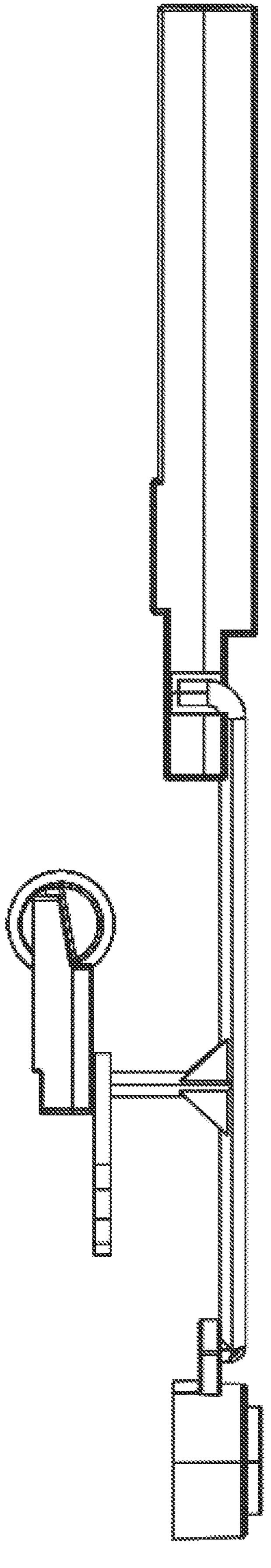
Figure 34:
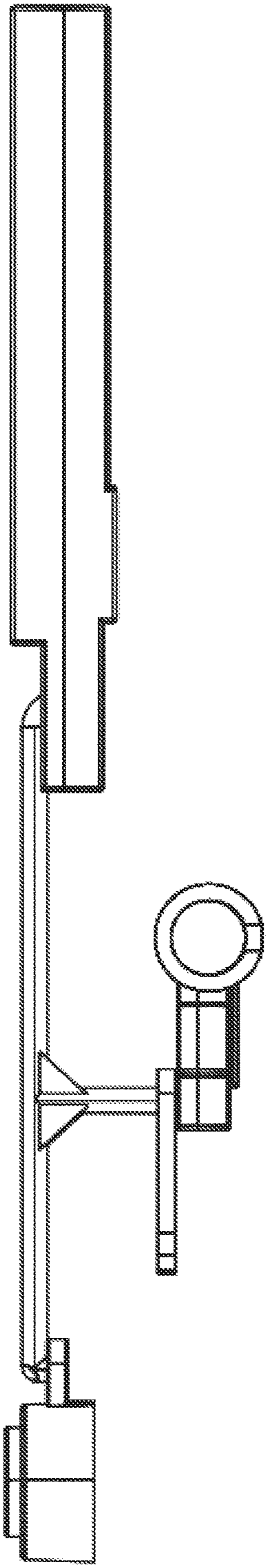
Figure 35:
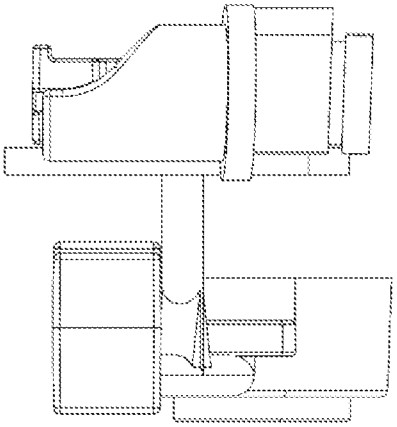
Figure 36:
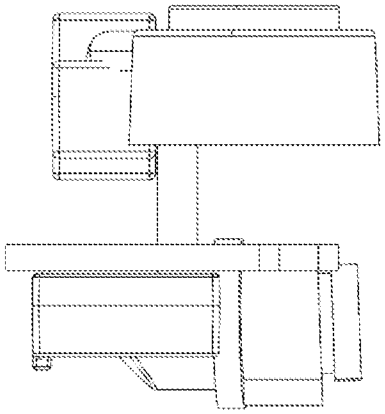

FIGS. 1 and 2 also illustrate additional features of the door handle assembly 100, such as volume control buttons 120, a reset button 122 and a learn button 124 (e.g., for use in conjunction with the keypad 158 and/or other devices), and an interior charging port 126 (e.g., to charge batteries for motorized lock/unlock components, wireless communication systems/devices, etc.). In some instances, an exterior charging port is provided on the door handle assembly to prevent lock-out in the event of battery depletion (see FIG. 29, showing an exterior charging port 2902 positioned in a space between the handle 152 and the rest of the exterior face 154 of the exterior assembly 150).

Figure 3:
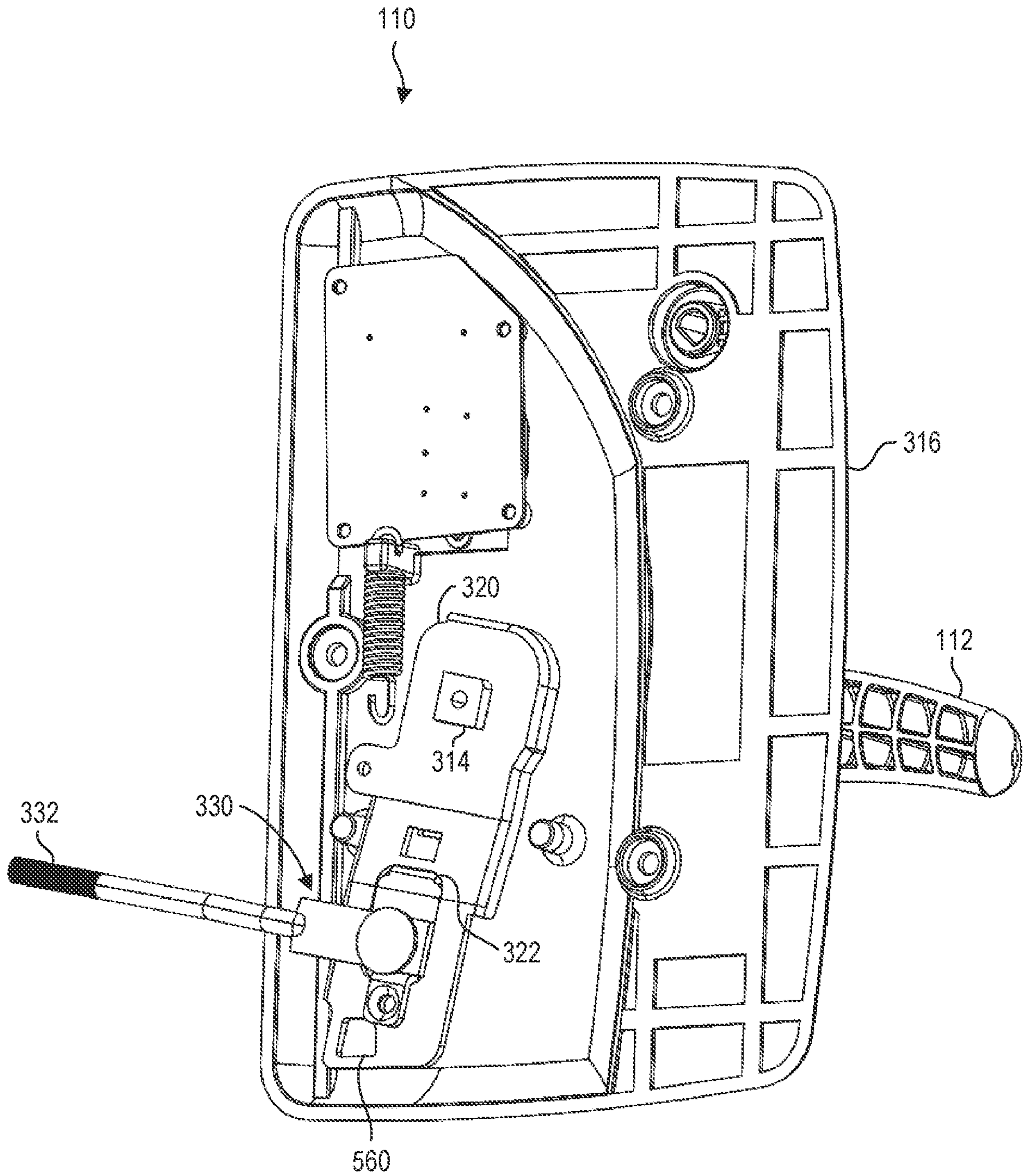
FIG. 3 illustrates a perspective view of internal components of an interior assembly of an example door handle assembly, including a release plate and a linkage rod assembly, according to implementations of the disclosed subject matter.

FIG. 3 illustrates a perspective view of internal components of the interior assembly 110 of the door handle assembly 100. In particular, FIG. 3 illustrates a release plate 320 and a door linkage rod assembly 330 of the interior assembly 110. In the example of FIG. 3, the release plate 320 is in mechanical communication with the handle 112 via an extension 314 that extends through an interior faceplate 316 of the interior assembly 110. Actuation of the handle 112 (e.g., rotation) can thus cause rotation of the release plate 320.

The release plate 320 defines a window 322 that receives the door linkage rod assembly 330, enabling the door linkage rod assembly 330 to be secured to the release plate 320. When the door linkage rod assembly 330 is secured to the release plate 320, rotation of the release plate 320 (e.g., by operation of the handle 112) may cause actuation of a linkage rod 332 of the door linkage rod assembly 330. The linkage rod 332 may be connected to a trip lever of a door latch assembly of a door to trigger operation of the door latch assembly when the linkage rod 332 is actuated.

Figure 4:
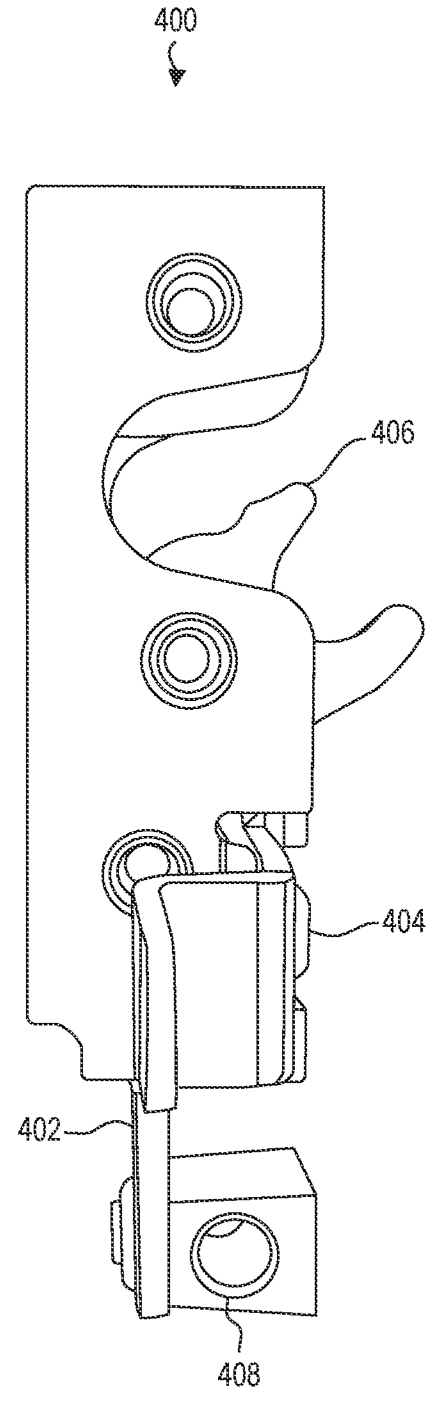
FIG. 4 illustrates a perspective view of a door latch assembly configured to interface with the linkage rod assembly of FIG. 3, according to implementations of the disclosed subject matter.

FIG. 4 illustrates an example door latch assembly 400 that may be connected to a door (e.g., on the latch edge/side of the door) and may interface with the linkage rod 332. For instance, the door latch assembly 400 includes a trip lever 402 that is rotatable about a pivot 404. When sufficiently rotated about the pivot 404, the trip lever 402 may cause rotation of a rotor 406 into a disengaged position (i.e., the position shown in FIG. 4). When the rotor 406 is in the disengaged position, the door latch assembly 400 may freely disengage from a striker bolt of a door frame to enable opening of the door to which the door latch assembly 400 is attached.

In the example of FIG. 4, the trip lever 402 of the door latch assembly 400 includes a linkage rod receiver 408 through which the linkage rod 332 is configured to extend. After insertion through the linkage rod receiver 408, a linkage rod nut (not shown) may be threaded over the linkage rod 332 to prevent removal of the linkage rod 332 from the linkage rod receiver 408. The position of the linkage rod nut along the linkage rod 332 may be adjusted (e.g., by threading) to calibrate the amount of rotation of the handle 112 necessary to trigger rotation of the rotor 406 into the disengaged position.

Figure 5:
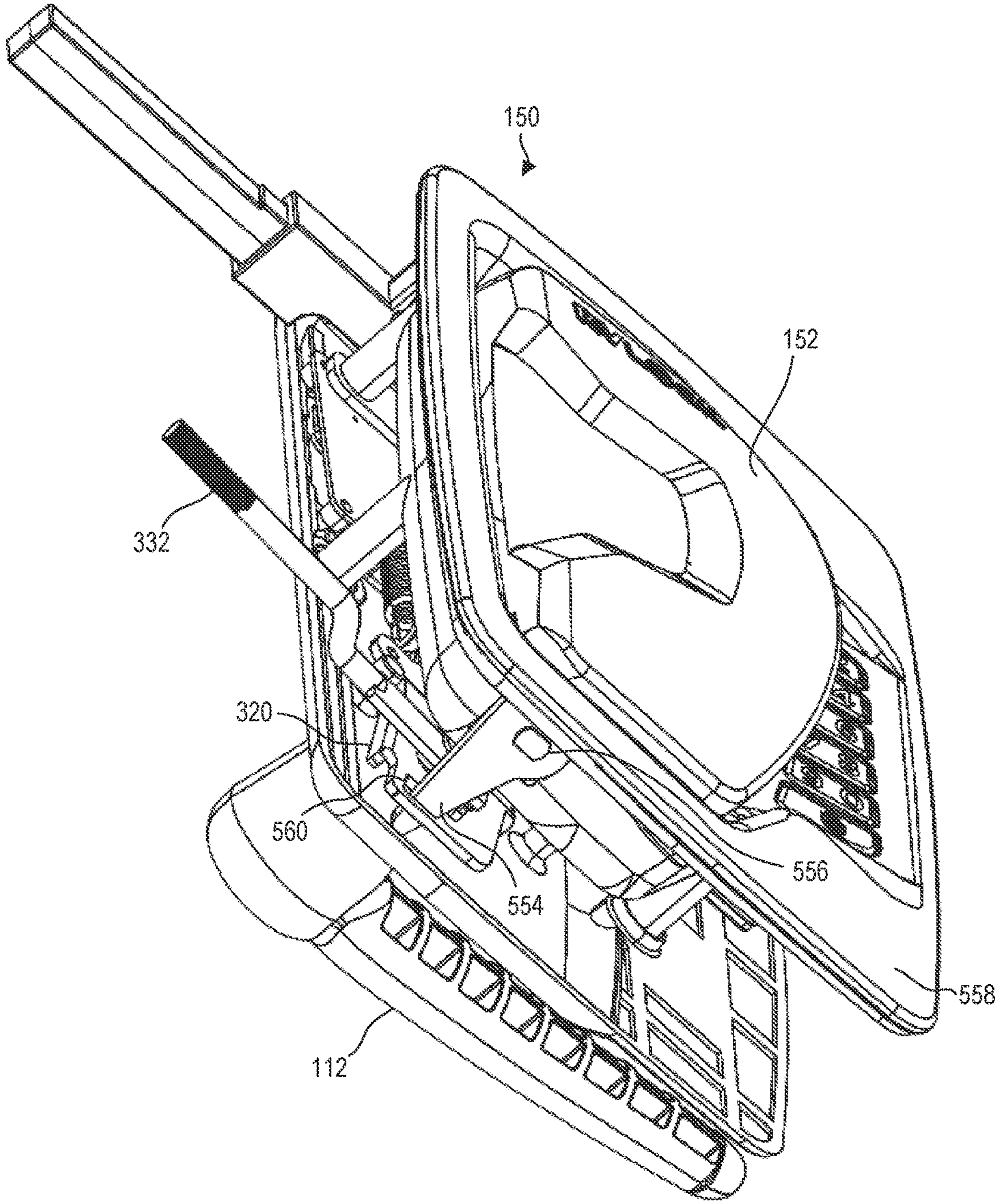
FIG. 5 illustrates a bottom perspective view of an example door handle assembly, according to implementations of the disclosed subject matter.

In some instances, the handle 152 of the exterior assembly 150 is also operable to cause rotation of the release plate 320, actuation of the linkage rod 332, and/or rotation of the trip lever 402 (e.g., when the linkage rod 332 is secured to the release plate and connected to the trip lever 402). For example, FIG. 5 provides another view of the door handle assembly 100, which illustrates a handle tooth 554 connected to the handle 152 via an extension 556 that extends through a portion of an exterior faceplate 558 of the exterior assembly 150. The handle tooth 554 is configured to insert into a second window 560 of the release plate 320 (also shown in FIG. 3). When the second window 560 receives the handle tooth 554, rotation of the handle 152 may cause rotation of the handle tooth 554 and, correspondingly, rotation of the release plate 320. Thus, in the example of FIG. 5, rotation of the handle 112 or the handle 152 may cause rotation of the release plate 320 (and actuation of the linkage rod 332 to cause rotation of the trip lever 402 to trigger rotation of the rotor 406, when the door handle assembly 100 and the door latch assembly 400 are installed on a door).

Figure 6:
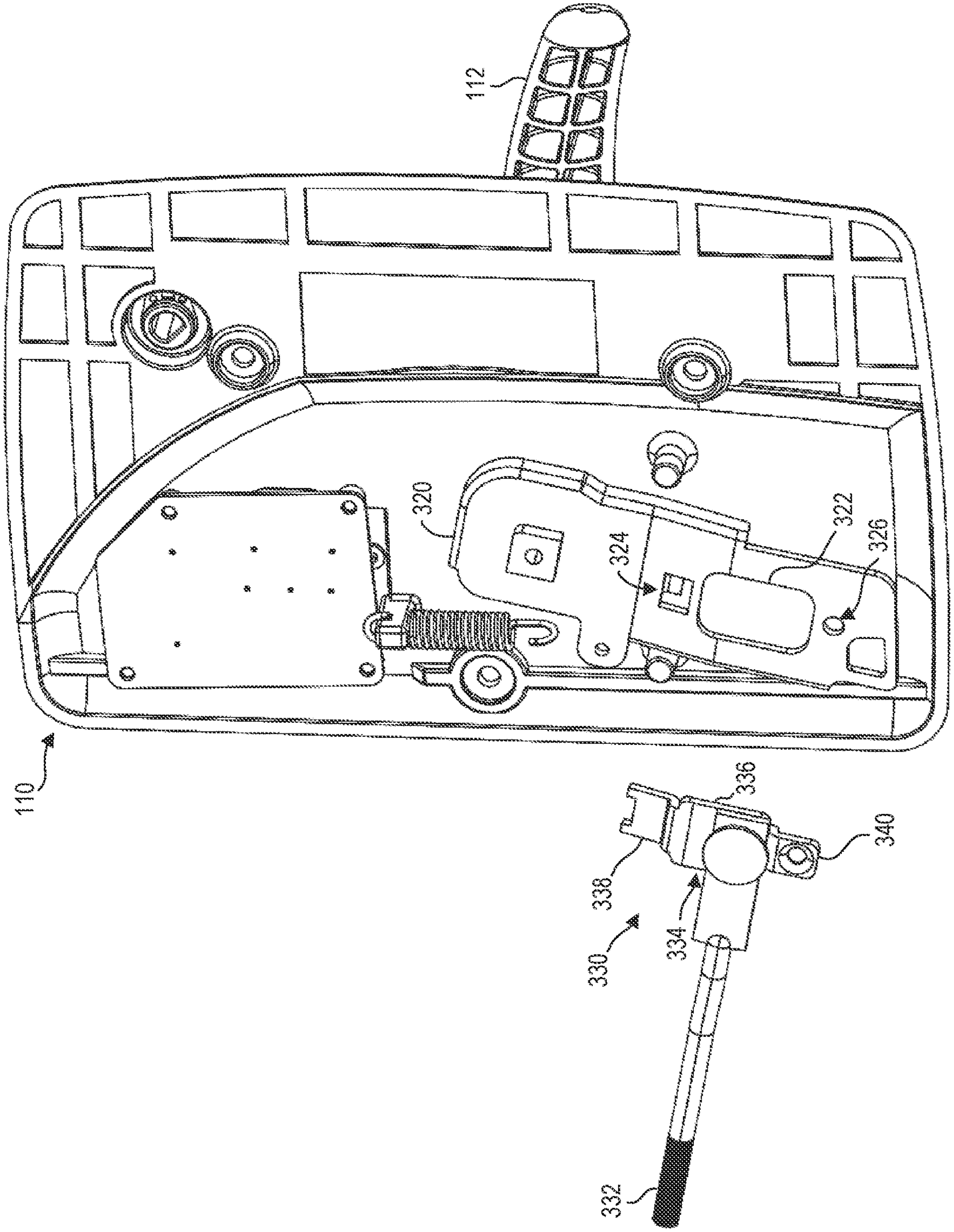
FIG. 6 illustrates a perspective view of internal components of an interior assembly of an example door handle assembly, with a linkage rod assembly selectively disconnected from a release plate to expose a window of the release plate, according to implementations of the disclosed subject matter.

In some embodiments, the door linkage rod assembly 330 is selectively removed/removable from the release plate 320, which may enable the door handle assembly 100 to interface with different types of doors and/or door latch systems. FIG. 6 illustrates the interior assembly 110 of the door handle assembly 100 with the door linkage rod assembly 330 removed from the release plate 320, thereby exposing the window 322 of the release plate 320. With the door latch assembly 330 removed or disconnected from the release plate 320, the window 322 of the release plate 320 may receive a projection of a trip lever of a door latch assembly of a door to trigger operation of the door latch assembly when the release plate 320 is rotated (e.g., by operation of the handle 112 and/or the handle 152).

Figure 7:
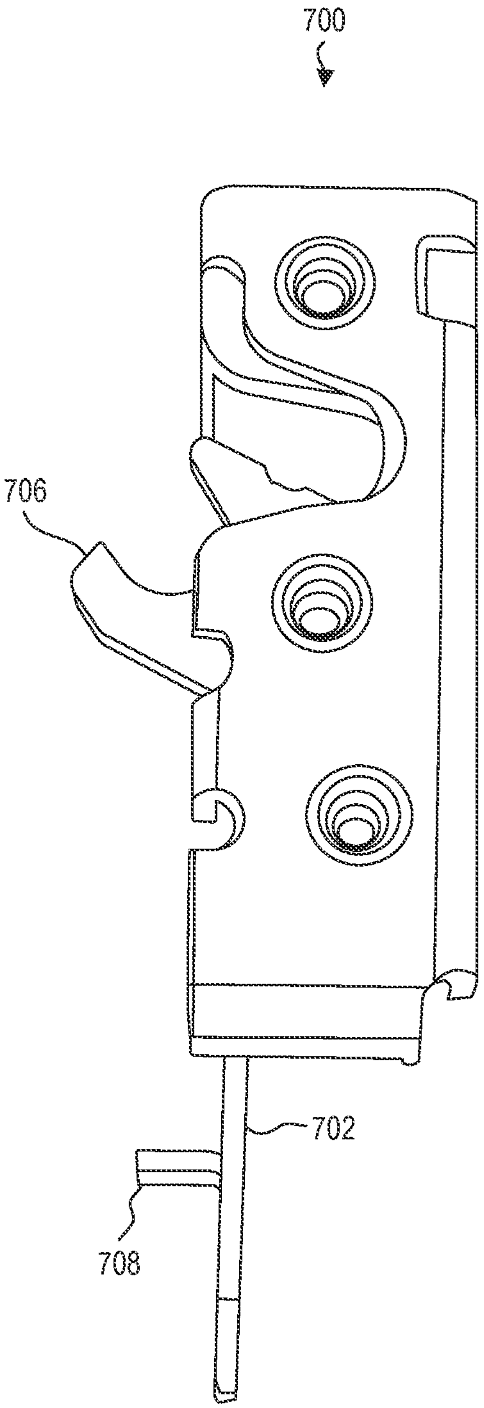
FIG. 7 illustrates a perspective view of a door latch assembly configured to interface with the window of the release plate of FIG. 6, according to implementations of the disclosed subject matter.

FIG. 7 illustrates an example door latch assembly 700 that may be connected to a door (e.g., on the latch edge/side of the door). The door latch assembly 700 is a different type of door latch assembly than the door latch assembly 400 described hereinabove with reference to FIG. 4. For instance, although the door latch assembly 700 also includes a rotatable trip lever 702 and a rotor 706, the trip lever 702 includes a projection 708 rather than a linkage rod receiver. The projection 708 of the trip lever 702 is configured to extend into the window 322 when the door handle assembly 100 and the door latch assembly 700 are affixed to a door (e.g., with the door linkage rod assembly 330 disconnected from the release plate 320). When so arranged, rotation of the release plate 320 may cause rotation of the projection 708 and the trip lever 702, which may trigger rotation of the rotor 706 into a disengaged position (i.e., the position shown in FIG. 7). When the rotor 706 is in the disengaged position, the door latch assembly 700 may freely disengage from a striker bolt of a door frame to enable opening of the door to which the door latch assembly 400 is attached.

Accordingly, the door linkage rod assembly 330 being selectively connectable to or disconnectable from the release plate 320 may enable the door handle assembly 100 to accommodate different types of door latch assemblies (e.g., door latch assemblies that utilize a linkage rod receiver or a trip lever projection as a means interfacing with a door handle).

The selective removability of the door linkage rod assembly 330 from the release plate 320 may be accomplished in various ways. In the example interior assembly 110 of FIG. 6, the release plate 320 includes engagement features 324 and 326 proximate to and on opposing sides of the window 322 for facilitating securement of the door linkage rod assembly 330 to the release plate 320. Furthermore, in the example of FIG. 6, the linkage rod assembly 330 includes a base 334 with a base body 336 to which the linkage rod 332 is pivotally connected. The base 334 also includes securement members 338 and 340 extending from opposing sides of the base body 336 for facilitating securement to the engagement features 324 and 326 of the release plate 320.

Figure 8:
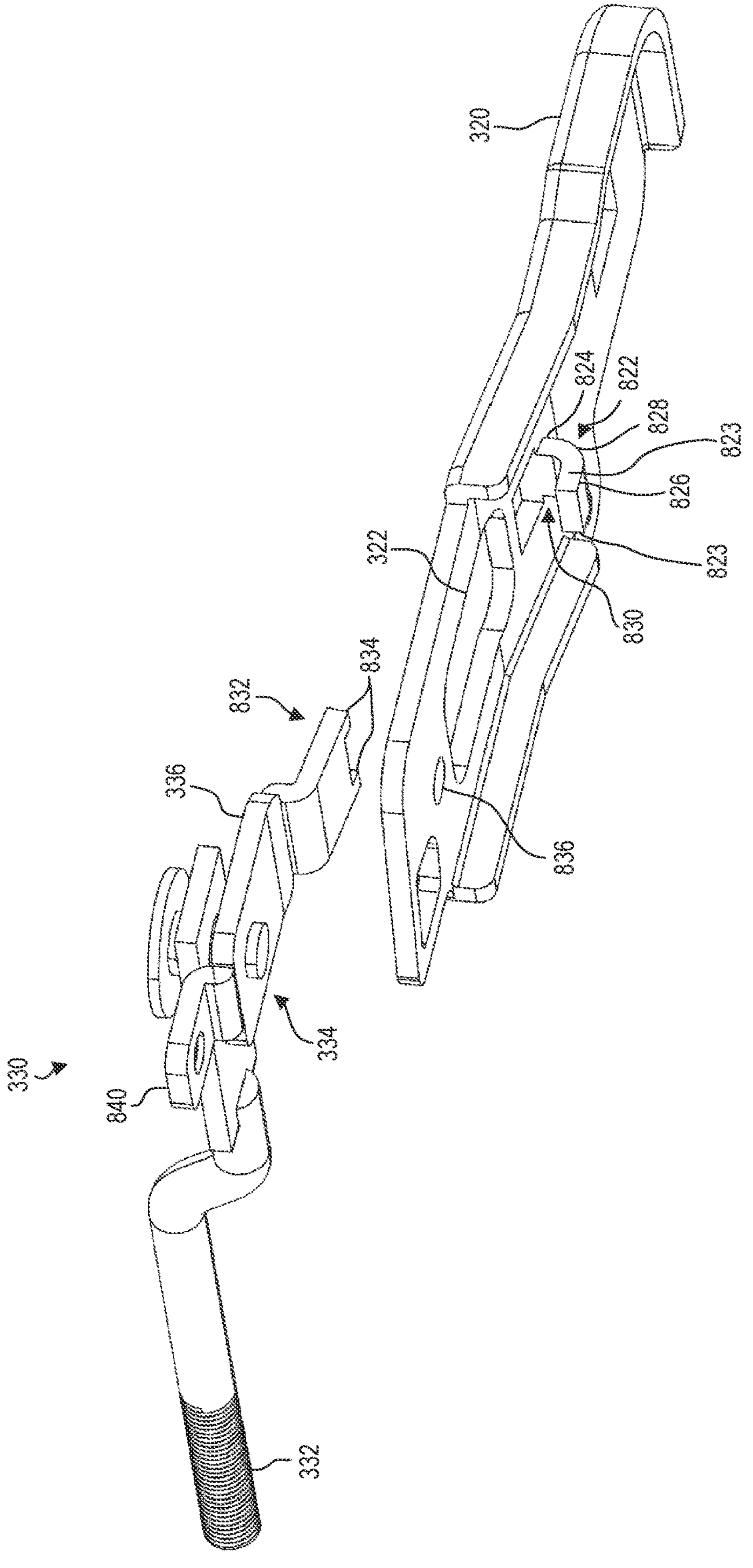
FIG. 8 illustrates a perspective view of a linkage rod assembly disconnected from a release plate of a door handle assembly, according to implementations of the disclosed subject matter.

The engagement features 324 and 326 of the release plate 320 and the securement members 338 and 340 of the door linkage rod assembly 330 may take on various forms, and additional or alternative engagement features or securement members may be utilized to facilitate retention of the door linkage rod assembly 330 by the release plate 320. FIG. 8 illustrates an example in which the engagement feature 324 of the release plate 320 is implemented as a receiving arm 822. The receiving arm 822 in the example of FIG. 8 is formed from multiple segments, including a first segment 824 that extends transversely from the release plate 320 (e.g., in a first direction) and a second segment 826 that extends from the first segment 824 (e.g., in a second direction that is angularly offset from the first direction). The receiving arm 822 includes an arcuate transition 828 between the first segment 824 and the second segment 826, though other types of transitions may be utilized.

Figure 9:
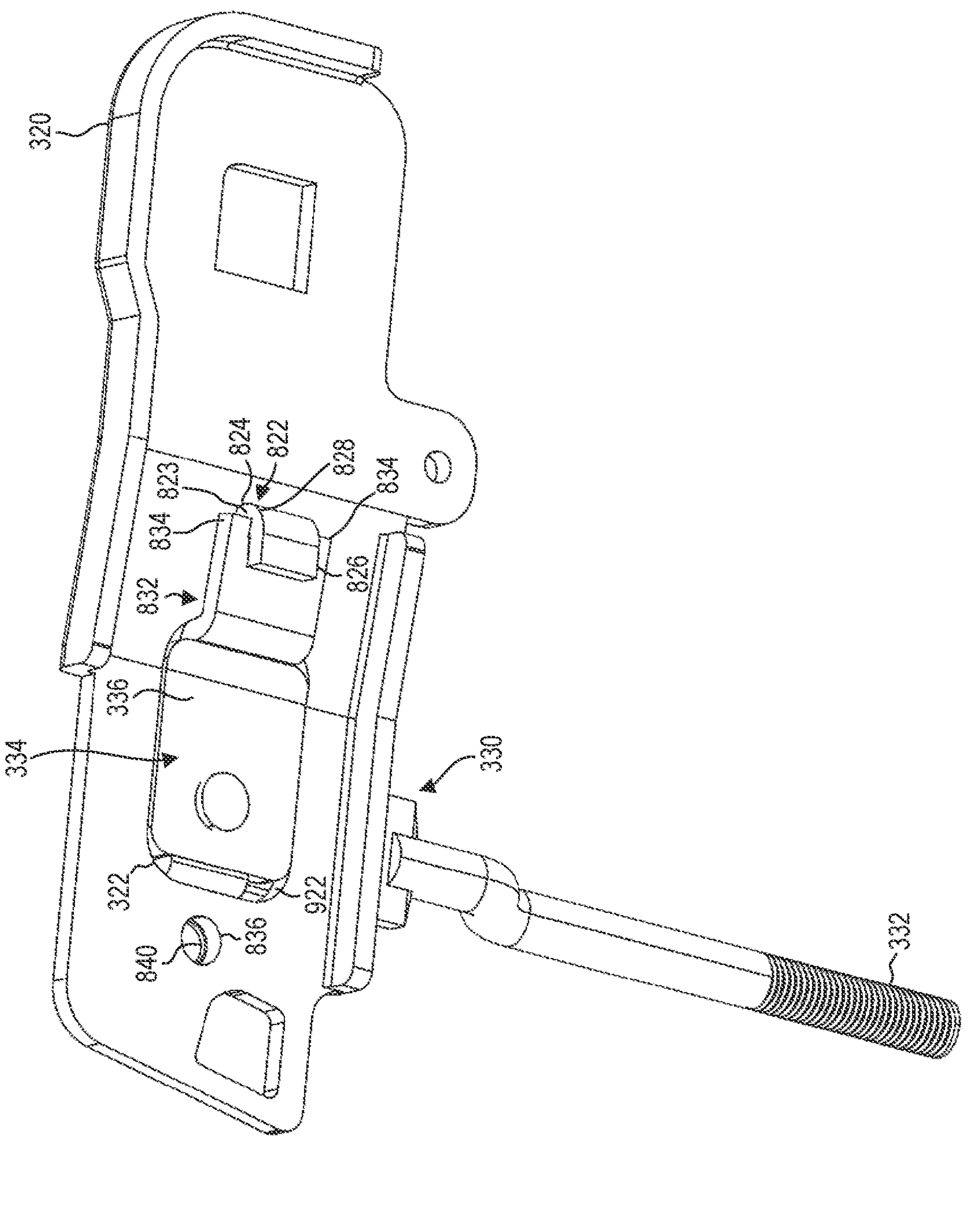
FIG. 9 illustrates a perspective view of a linkage rod assembly connected to a release plate of a door handle assembly, according to implementations of the disclosed subject matter.

The receiving arm 822 defines a receiving space 830 for receiving the securement member 338 of the linkage rod assembly 330. The securement member 338 is implemented in the example of FIG. 8 as a securement arm 832 that is planarly offset from the base body 336. The securement arm 832 may be inserted through the window 322 and into engagement with the receiving arm 822, as shown in FIG. 9. In the example of FIGS. 8 and 9, the securement arm 832 includes end protrusions 834 on opposing ends thereof. The end protrusions 834 may extend over opposing side edges 823 of the receiving arm 822 to mitigate lateral movement of the base 334 when secured to the release plate 320. FIG. 9 furthermore shows the base body 336 residing between sidewalls 922 of the release plate 320 that define the window 322 when the base 334 is secured to the release plate 320, which may further mitigate lateral movement of the base 334.

FIGS. 8 and 9 illustrate the engagement feature 326 implemented as a hole 836 and illustrate the securement member 340 implemented as a bolt plate 840 with a corresponding hole. When the base 334 is positioned for securement to the release plate 320 (as shown in FIG. 9), a bolt may be extended through the bolt plate 840 and the hole 836 (one or more of which may be threaded) to prevent withdrawal of the base 334 from the release plate 320. Thus, in the example of FIGS. 8 and 9, the base 334 of the door linkage rod assembly 330 may be selectively secured to the release plate 320 by placing the securement arm 832 into engagement with the receiving arm 822, positioning the base body 336 within the window 322, and securing the bolt plate 840 to the release plate 320 via a bolt through the bolt plate 840 and the hole 836. As noted above, other types and/or configurations of securement/engagement features may be utilized to secure the base 334 of the door linkage rod assembly 330 to the release plate 320.

Various components described hereinabove may be provided as a door handle kit that enables users to perform modifications if necessary to configure a door handle assembly for installation with their existing door and door latch assembly. For instance, a door handle kit may include components of at least (i) a door linkage rod assembly (330) with a linkage rod (332) and a base (334), and (ii) a door handle assembly (100, 110) with a release plate (320) that defines a window (322) and that can selectively receive and secure the door linkage rod assembly (330).

Door Locking Systems

Figure 10:
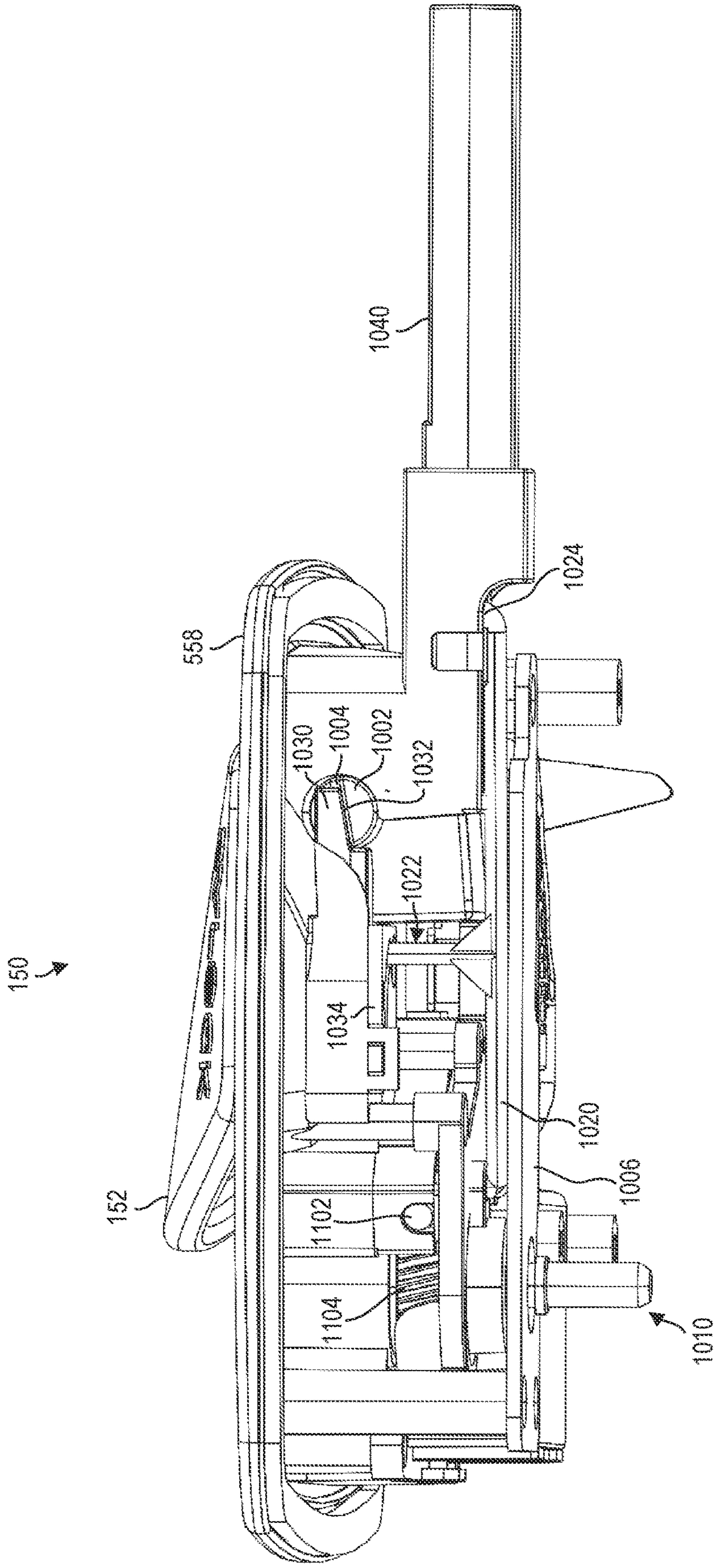
FIG. 10 illustrates a top perspective view of locking components of a door handle assembly, according to implementations of the disclosed subject matter.

FIG. 10 illustrates a top perspective view of locking components arranged on an exterior assembly 150 of a door handle assembly 100. In particular, FIG. 10 illustrates a lock actuator 1010 that is actuatable between unlocked and locked positions. FIG. 10 also illustrates a linkage bar 1020 that is in mechanical communication with the lock actuator 1010. The linkage bar 1020 extends from the lock actuator toward various additional locking components. For instance, FIG. 10 shows the linkage bar 1020 as including a handle lock engagement member 1022 that engages with a handle locking bolt 1030. The linkage bar 1020 of FIG. 10 also includes a deadbolt engagement member 1024 that engages with a deadbolt 1040.

Under the configuration shown in FIG. 10, actuation of the lock actuator 1010 between locked and unlocked positions causes actuation of the linkage bar 1020, which in turn causes actuation of the handle locking bolt 1030 and the deadbolt 1040 between locked and unlocked positions. The locked position for the linkage bar 1020, the handle locking bolt 1030, and the deadbolt 1040 is illustrated in FIG. 10. When the deadbolt 1040 is in the locked position, the deadbolt 1040 is configured to engage with a mortice (e.g., of a door frame) to prevent opening of a door to which the door handle assembly 100 is affixed/attached.

When the handle locking bolt 1030 is in the locked position, the handle locking bolt 1030 prevents rotation of the handle 152. For instance, in the example of FIG. 10, the handle locking bolt 1030 interfaces with an extension 1002 that extends from the handle 152 through a portion of the exterior faceplate 558 of the exterior assembly 150. The handle locking bolt 1030 of FIG. 10 comprises a notch surface 1032 that interfaces with a corresponding notch surface 1004 of the extension 1002 to prevent rotation of the extension 1002 and the handle 152 connected to the extension 1002. The notch surfaces 1032 and 1004 may take on any suitable shape (e.g., flat notch surfaces, curved notch surfaces, combinations thereof, etc.). Although notch surfaces are shown in FIG. 10, other interfacing components may be utilized on the handle locking bolt 1030 and the extension 1002 to facilitate rotational locking of the handle 152. For instance, the extension 1002 may form a slot configured to receive at least part of the handle locking bolt 1030 to prevent rotation of the extension 1002 and the handle 152.

Figure 11:
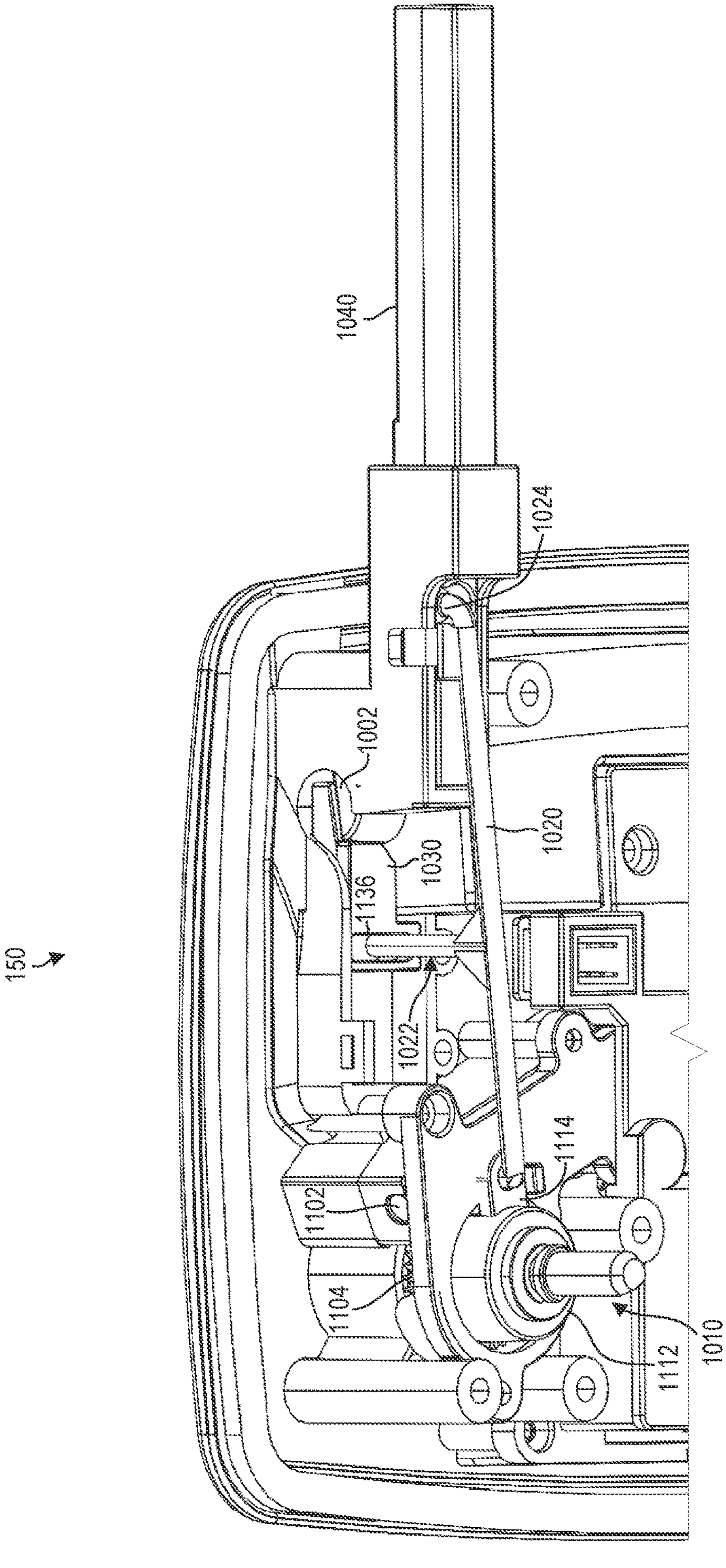
FIGS. 11 and 12 illustrate perspective views of locking components of a door handle assembly in a locked position, according to implementations of the disclosed subject matter.

FIG. 10 shows a handle locking bolt plate 1034 configured to guide travel of the handle lock engagement member 1022 during actuation between the locked and unlocked positions. FIG. 10 furthermore shows a lock plate 1006 configured to retain the linkage bar 1020 in engagement with the lock actuator 1010, the handle locking bolt 1030, and/or the deadbolt 1040. FIG. 11 illustrates a view of various locking components of the exterior assembly 150 with the handle locking bolt plate 1034 and the lock plate 1006 removed. FIG. 11 illustrates the lock actuator 1010, linkage bar 1020, handle locking bolt 1030, and deadbolt 1040 described above with reference to FIG. 10.

In the example of FIG. 11, the lock actuator 1010 comprises a lock cam 1112 with a crank arm 1114 connected thereto. The linkage bar 1020 engages with the crank arm 1114 at a first end of the linkage bar 1020, while the linkage bar engages with the deadbolt 1040 at a second end of the linkage bar 1020. The handle lock engagement member 1022 is positioned between the first end and the second end of the linkage bar 1020. When so configured, rotation of the lock cam 1112 causes translational movement of the linkage bar 1020 to facilitate locking and unlocking functionality.

Rotation of the lock cam 1112 may be effectuated in various ways, such as via the key cylinder 156, the thumb turn 116, the lock/unlock buttons 118, and/or the keypad 158 (see FIGS. 1 and 2). The key cylinder 156 and the thumb turn 116 may be mechanically connected to the lock cam 1112 such that actuation of the key cylinder 156 and/or the thumb turn 116 causes actuation of the lock cam 1112. The lock/unlock buttons 118 and/or the keypad 158 (and/or wireless communication devices such as key fobs, remote controls, smartphones, etc.) may be configured to output or transmit signals detectable by componentry of the door handle assembly 100 to trigger operation of a motor system that causes actuation of the lock cam 1112. For instance, the motor system may drive a worm gear 1102 (also labeled in FIG. 10) that interfaces with a cam gear 1104 (also labeled in FIG. 10) to cause rotation of the lock cam 1112 to facilitate locking and/or unlocking.

FIG. 11 illustrates the handle locking bolt 1030 as comprising an elongated slot 1136 for receiving the handle lock engagement member 1022 of the linkage bar 1020. In some implementations, the elongated slot 1136 permits movement of the handle lock engagement member 1022 in a translational direction that is angularly offset from the locking/unlocking translational direction of the handle locking bolt 1030, while maintaining engagement between the handle lock engagement member 1022 and the handle locking bolt 1030. The translational movement of the handle lock engagement member 1022 with multiple directional components (e.g., horizontal and vertical) may be caused by the rotational movement of the lock cam 1112 to which the crank arm 1114 and the linkage bar 1020 are connected.

Figure 12:
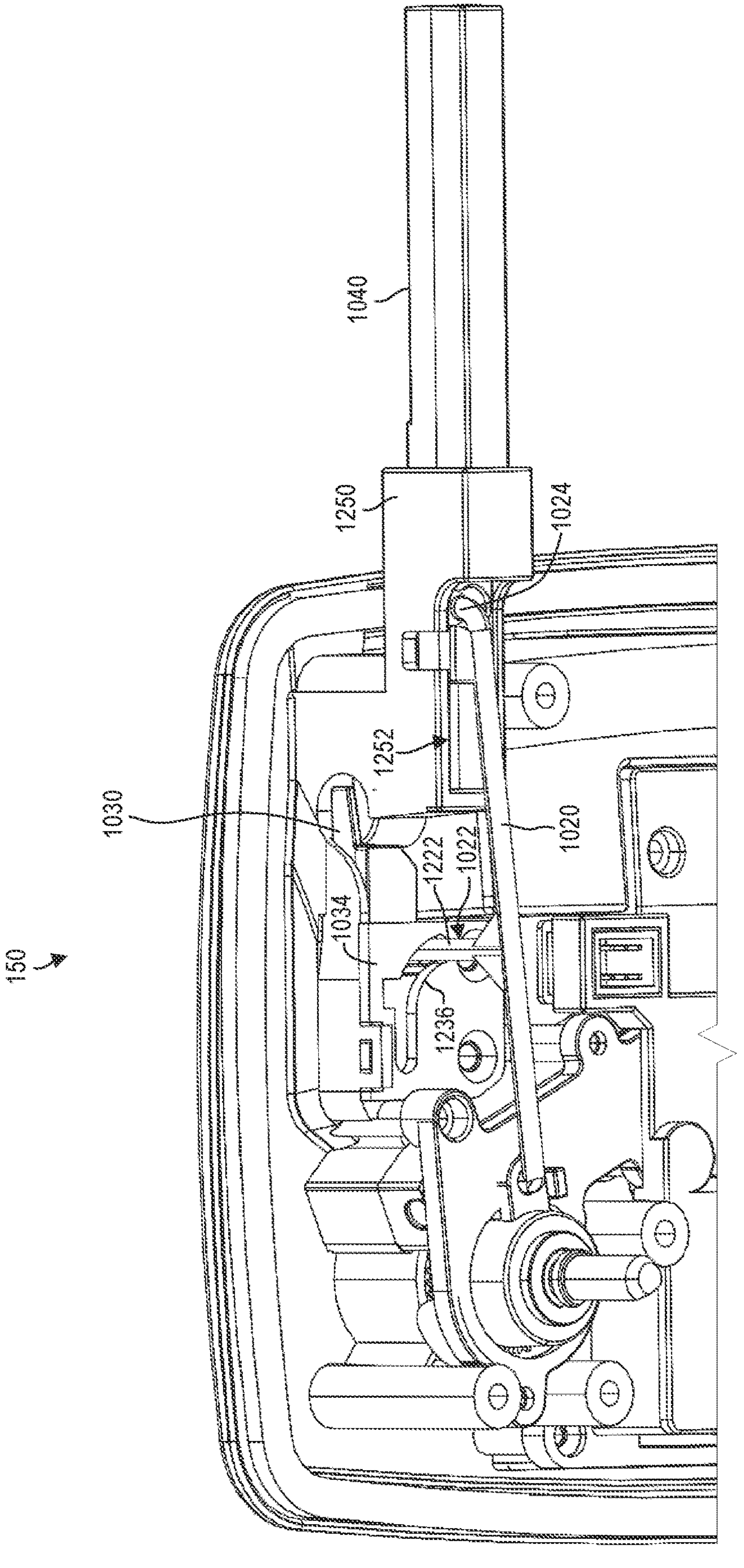

FIG. 12 illustrates locking components of the exterior assembly 150 in the locked position with the handle locking bolt plate 1034 included/shown. In the example of FIG. 12, the handle locking bolt plate includes a guide slot 1236 through which a lateral extension 1222 of the handle lock engagement member 1022 is configured to extend. The guide slot 1236 of FIG. 12 comprises a curved slot configured to guide travel of the lateral extension 1222 while retaining engagement between the lateral extension 1222 and the handle locking bolt 1030 during travel.

FIG. 12 furthermore illustrates that a deadbolt housing 1250 configured to house the deadbolt 1040 also includes a guide slot 1252. The guide slot 1252 of FIG. 12 comprises a linear slot through which the deadbolt engagement member 1024 (which forms a lateral extension) extends to engage with the deadbolt 1040 positioned within the deadbolt housing 1250.

Figure 13:
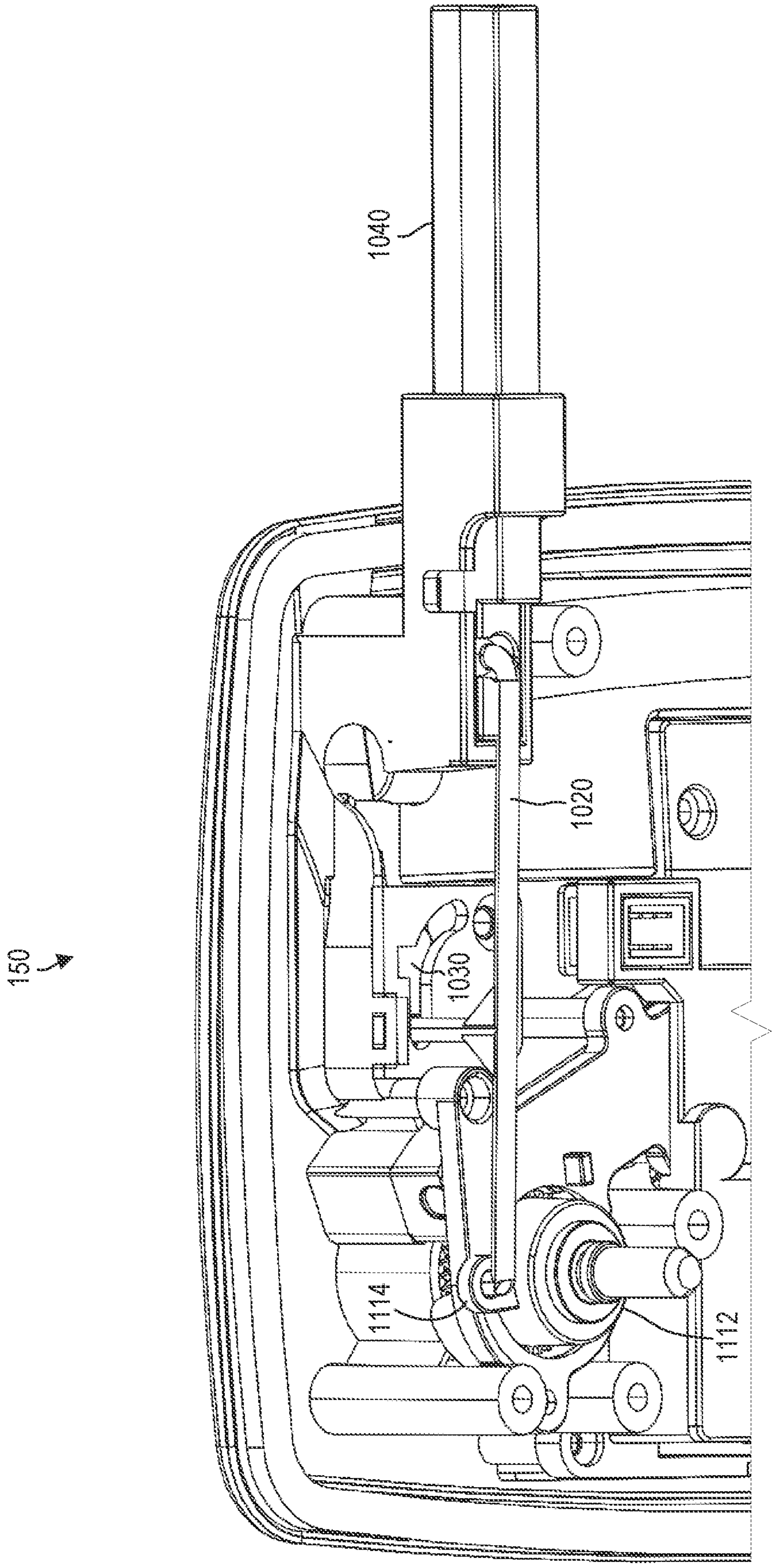
FIG. 13 illustrates a perspective view of locking components of a door handle assembly in an unlocked position, according to implementations of the disclosed subject matter.

FIG. 13 illustrates locking components of the exterior assembly 150 in the unlocked position. FIG. 13 shows the lock cam 1112 and the crank arm 1114 rotated into an unlocked position, which causes translational movement of the linkage bar 1020, the handle locking bolt 1030, and the deadbolt 1040 into the unlocked position.

Figure 14:
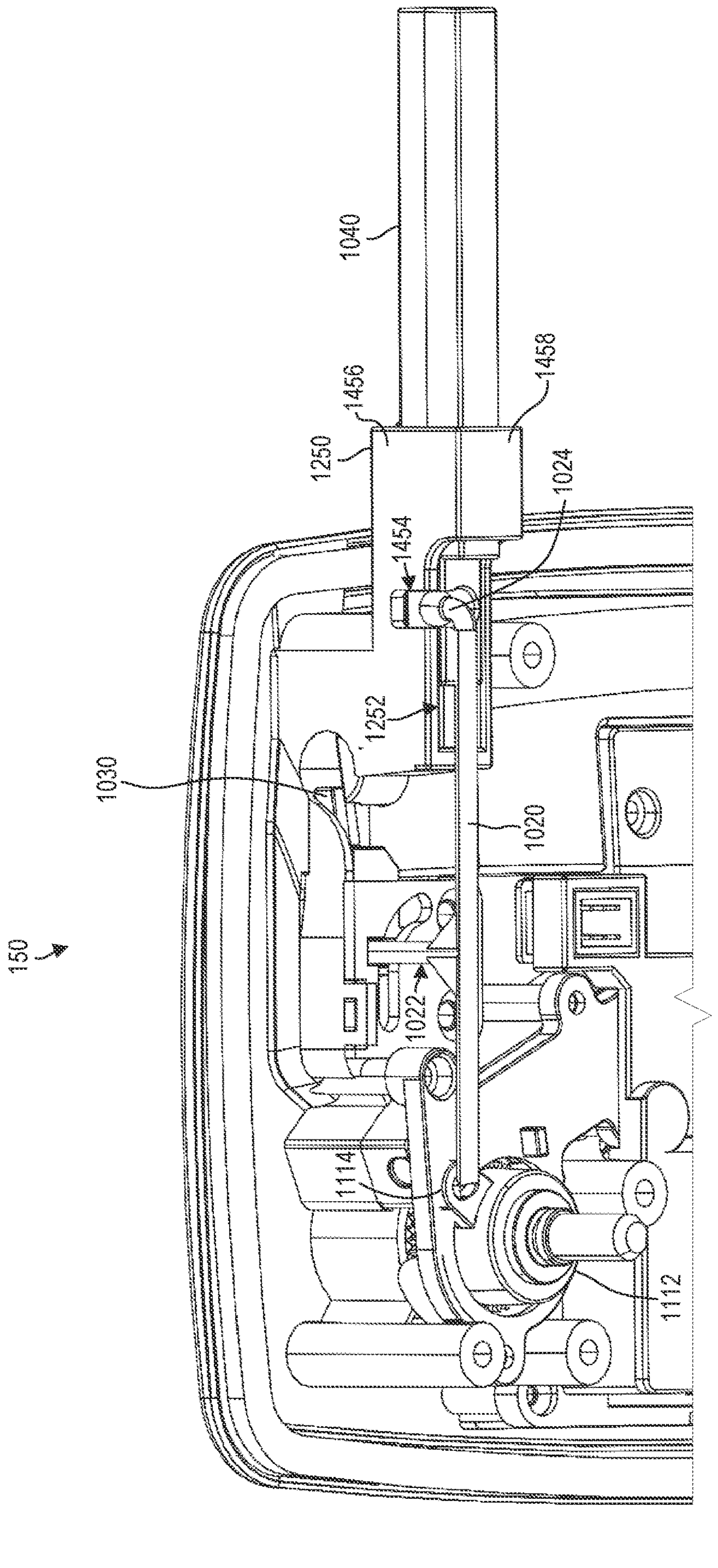
FIGS. 14 and 15 illustrate perspective views of locking components of a door handle assembly in lock reconfiguration positions, according to implementations of the disclosed subject matter.

As noted above, in some implementations, a deadbolt of a door handle assembly may be selectively removable to accommodate different types of doors, frames, etc. (e.g., prior to installation of the door handle assembly). FIG. 14 illustrates the lock cam 1112 and crank arm 1114 rotated to an intermediate position that permits modification of the deadbolt engaged with the deadbolt engagement member 1024. In the example of FIG. 14, the deadbolt 1040 and deadbolt engagement member 1024 are translated to an intermediate position along the guide slot 1252 (e.g., between the locked and unlocked positions) that aligns the deadbolt engagement member 1024 with a removal slot 1454 that is contiguous with the linear portion of the guide slot 1252. The removal slot 1454 of FIG. 14 extends onto a surface 1456 (e.g., a top surface) of the deadbolt housing 1250 that is adjacent to a surface 1458 (e.g., a side surface) on which the linear portion of the guide slot 1252 is positioned.

Figure 15:
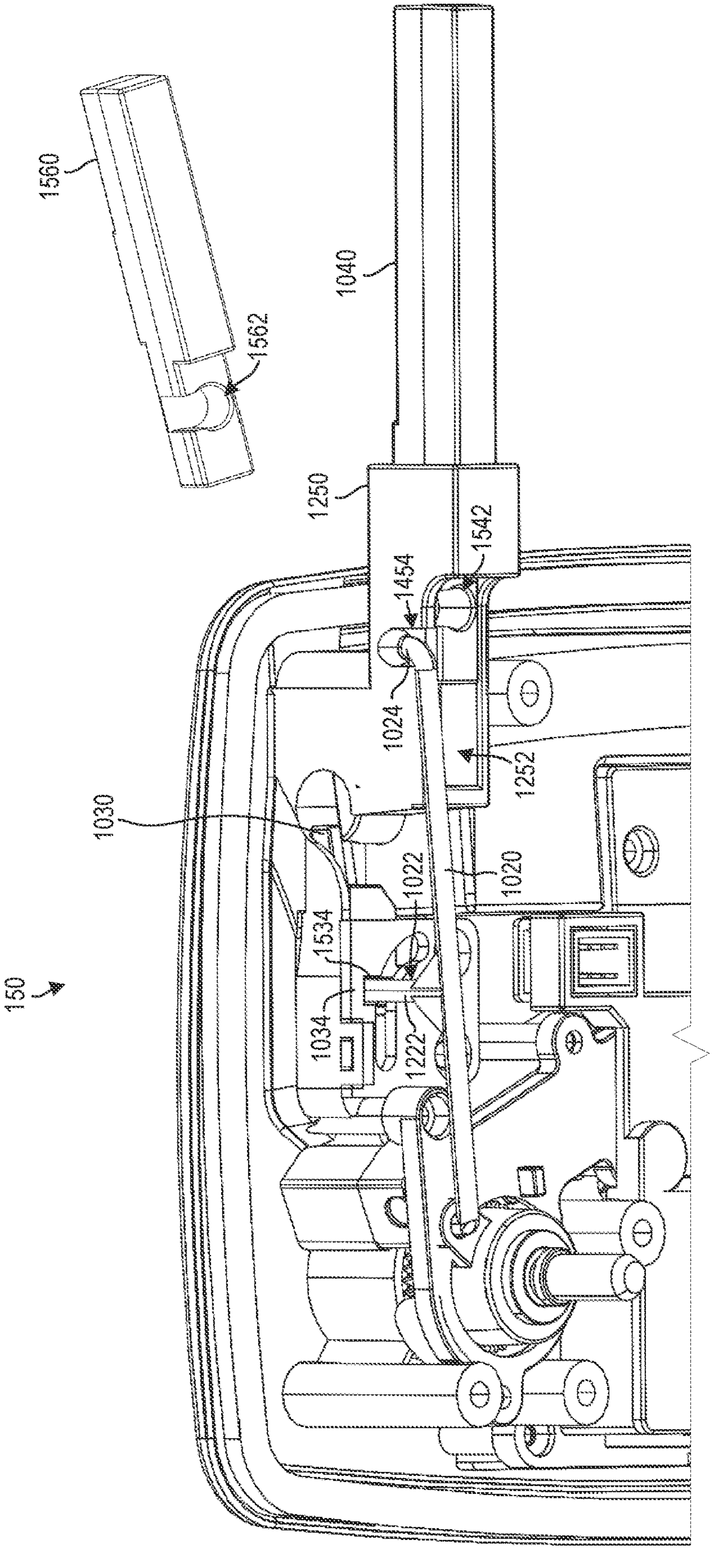
Figure 16:
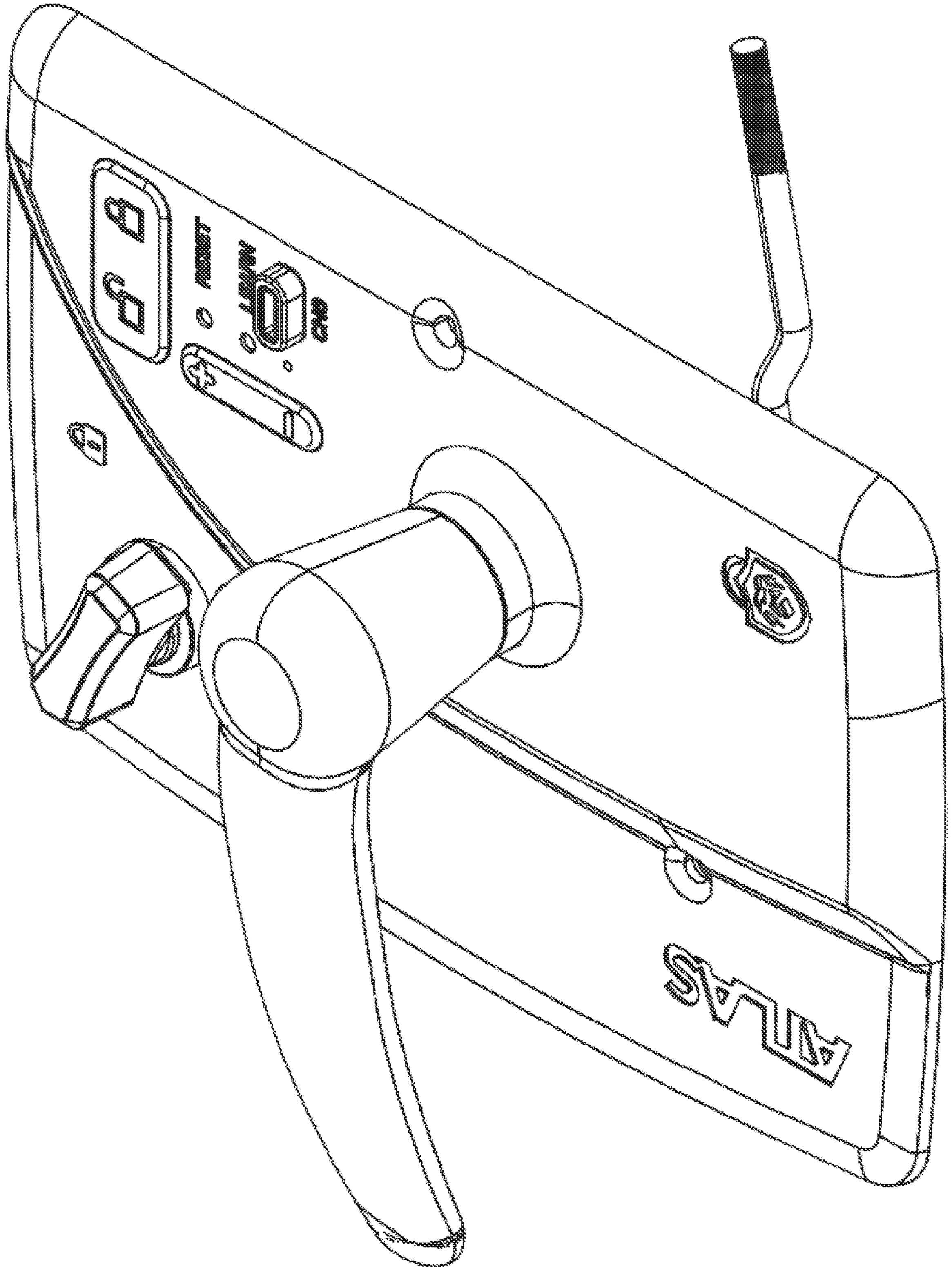
FIGS. 16 through 22 illustrate various views of an interior assembly of a door handle assembly, according to implementations of the disclosed subject matter.
Figure 17:
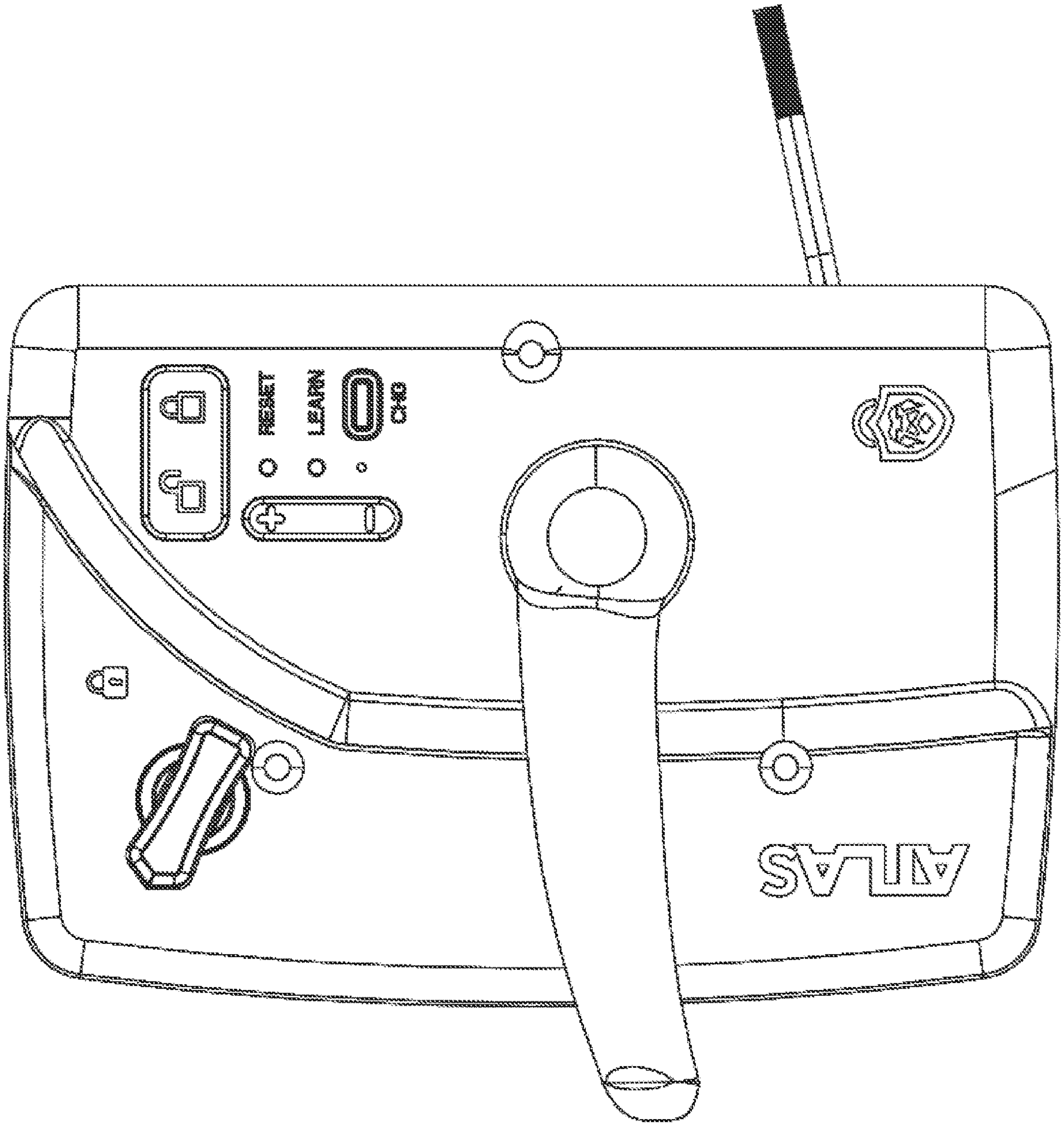
Figure 18:
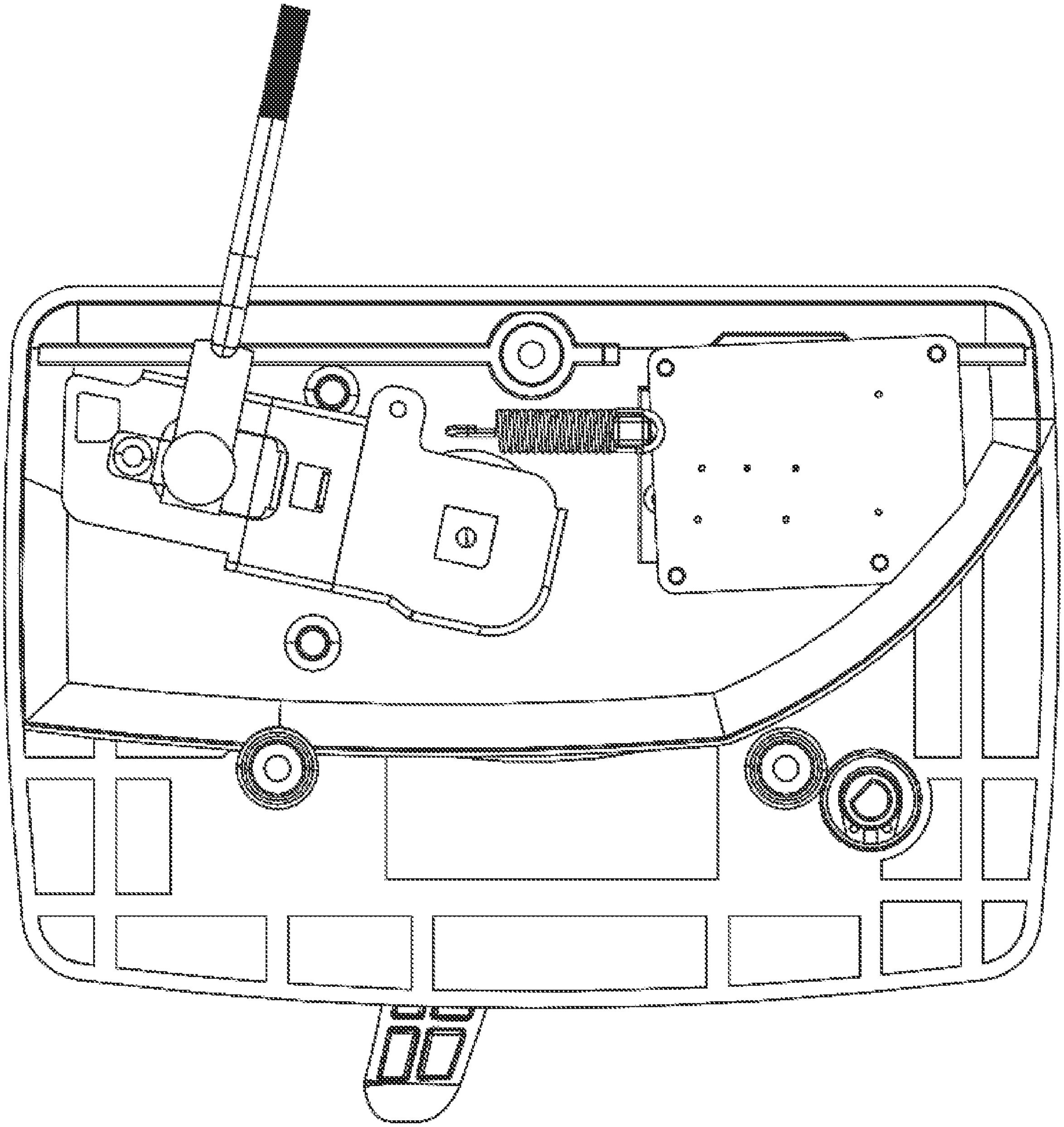
Figure 19:
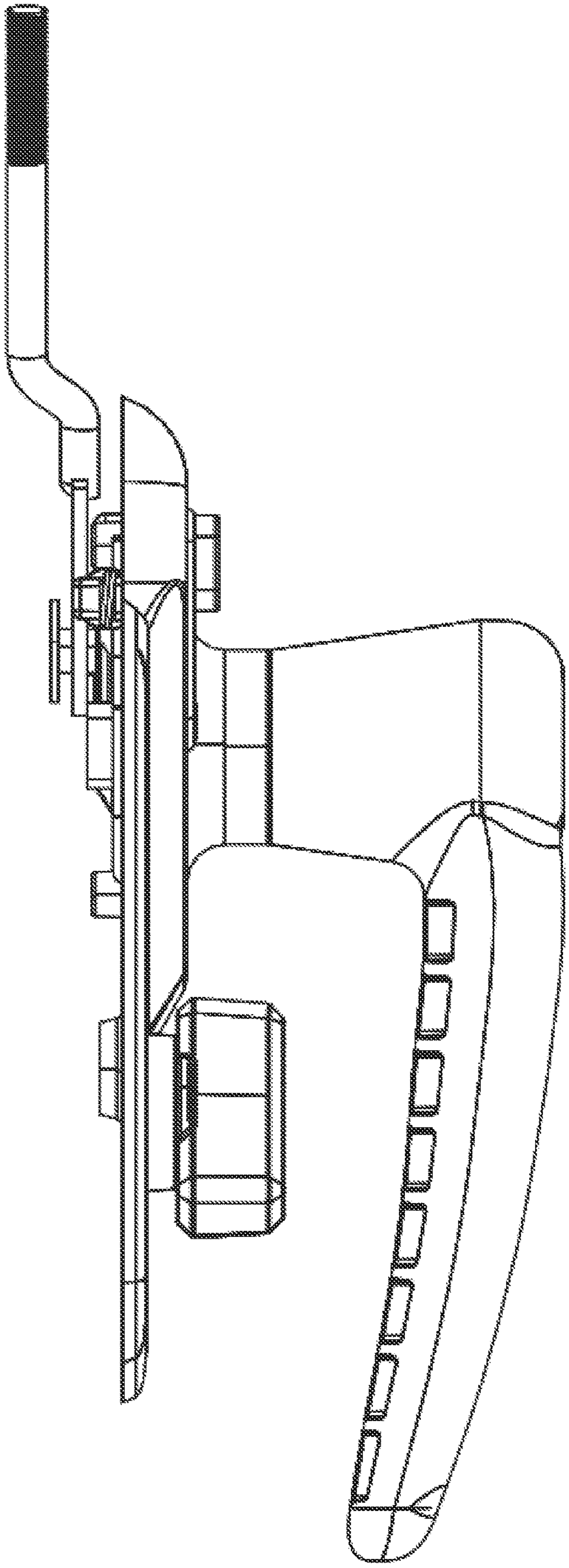
Figure 20:
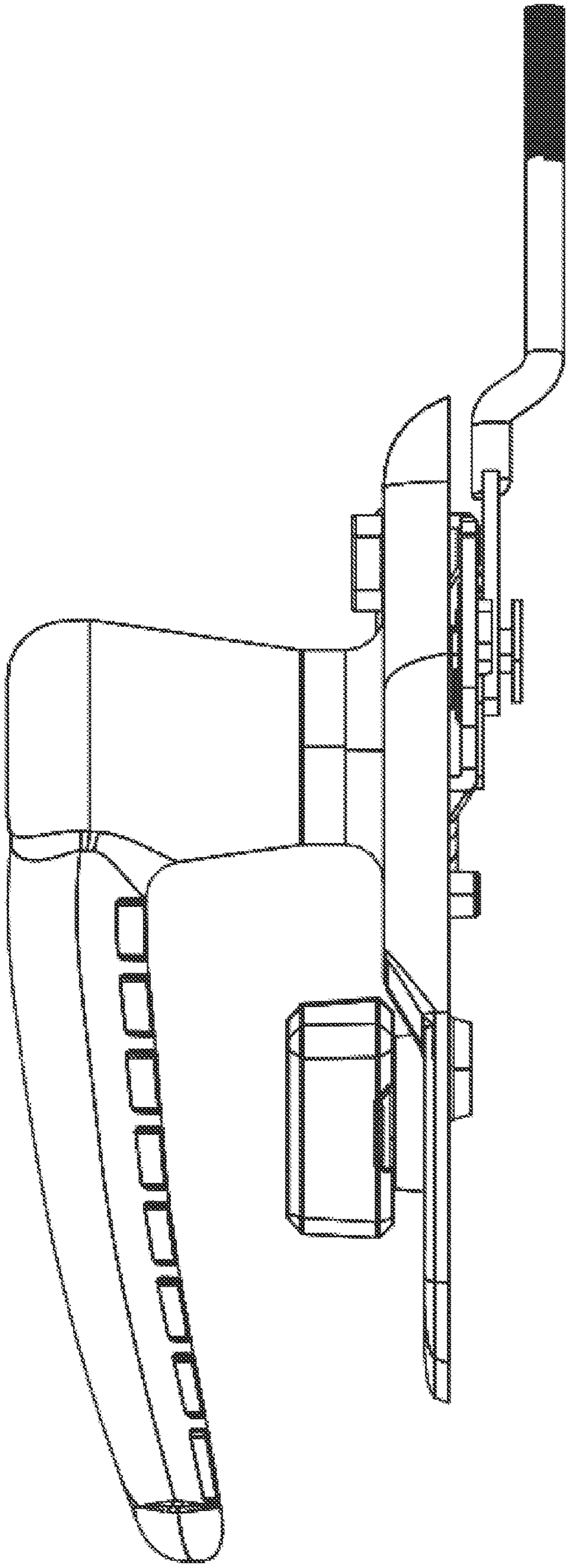
Figure 21:
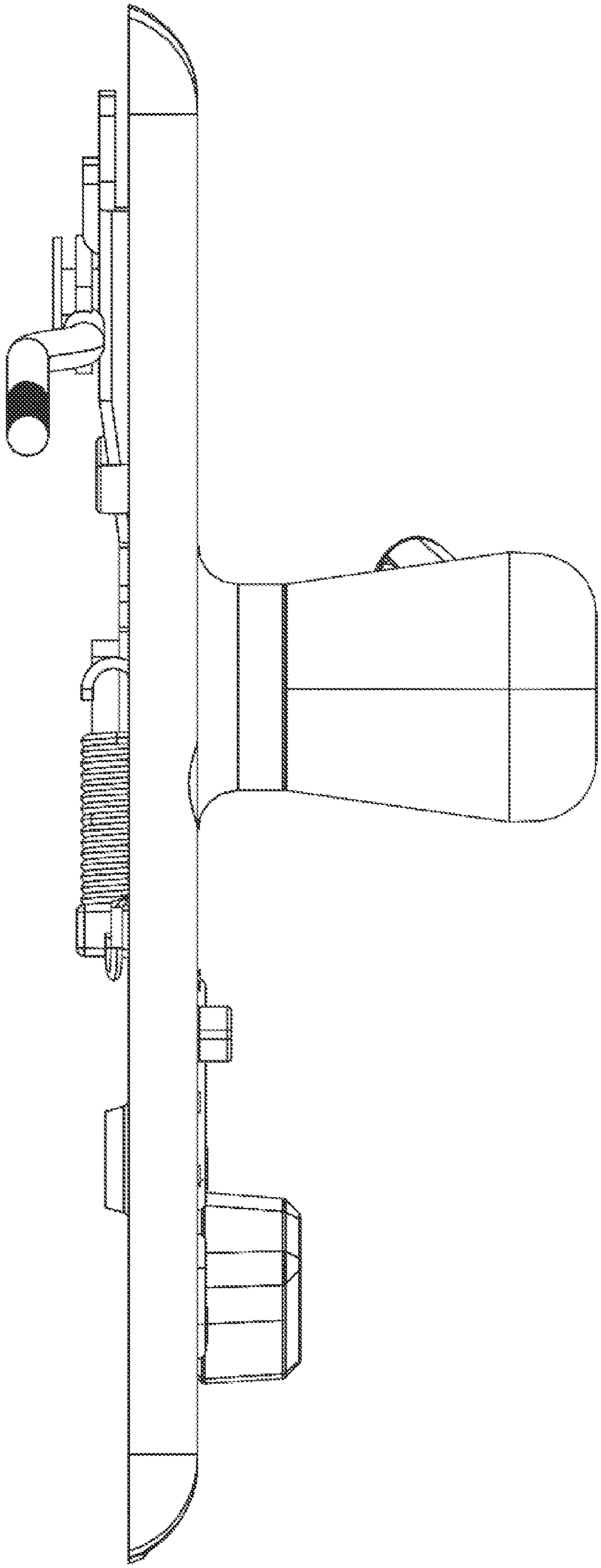
Figure 22:
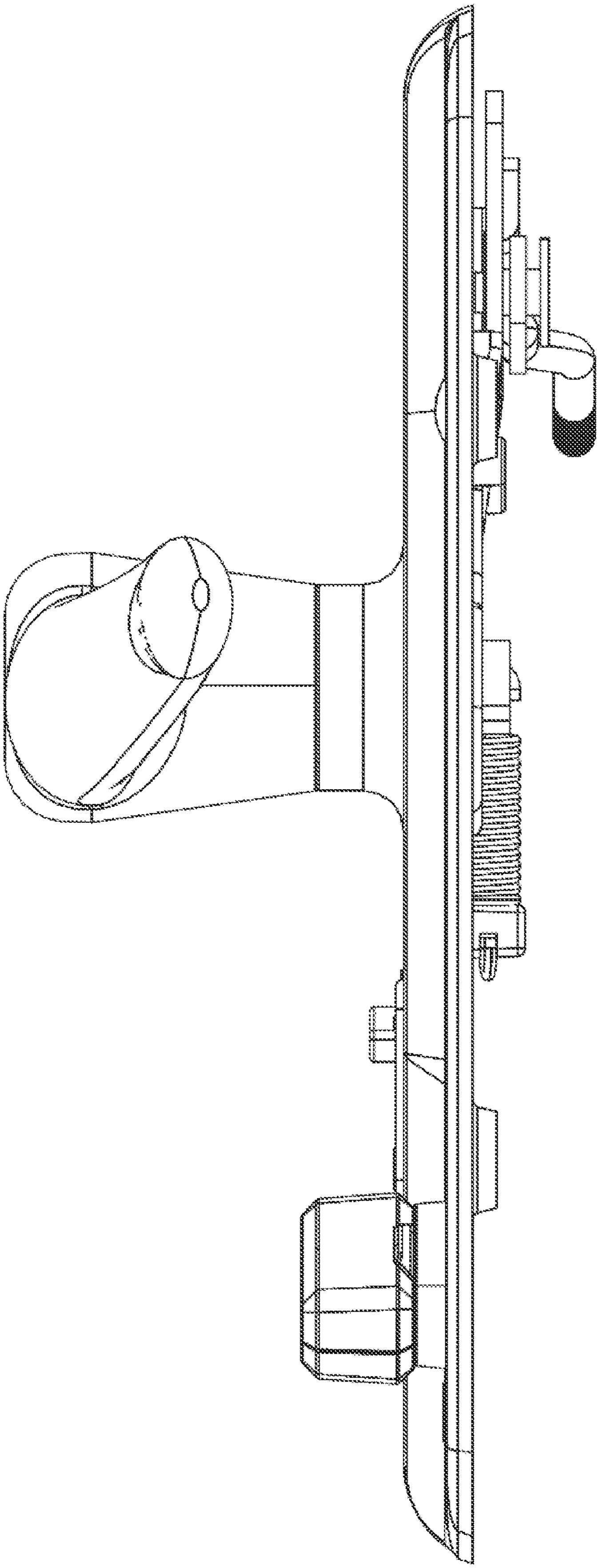
Figure 23:
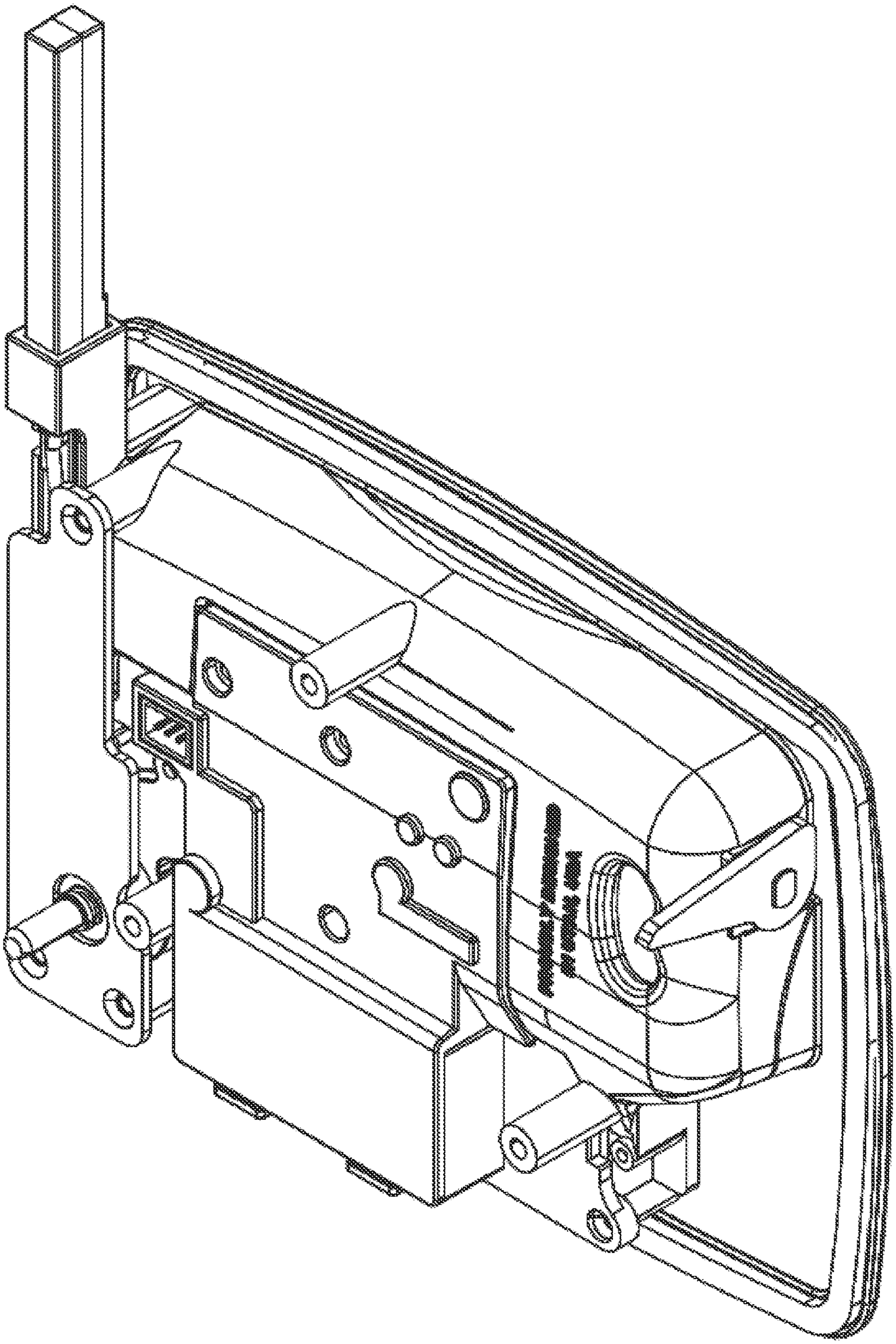
FIGS. 23 through 29 illustrate various views of an exterior assembly of a door handle assembly, according to implementations of the disclosed subject matter.
Figure 24:
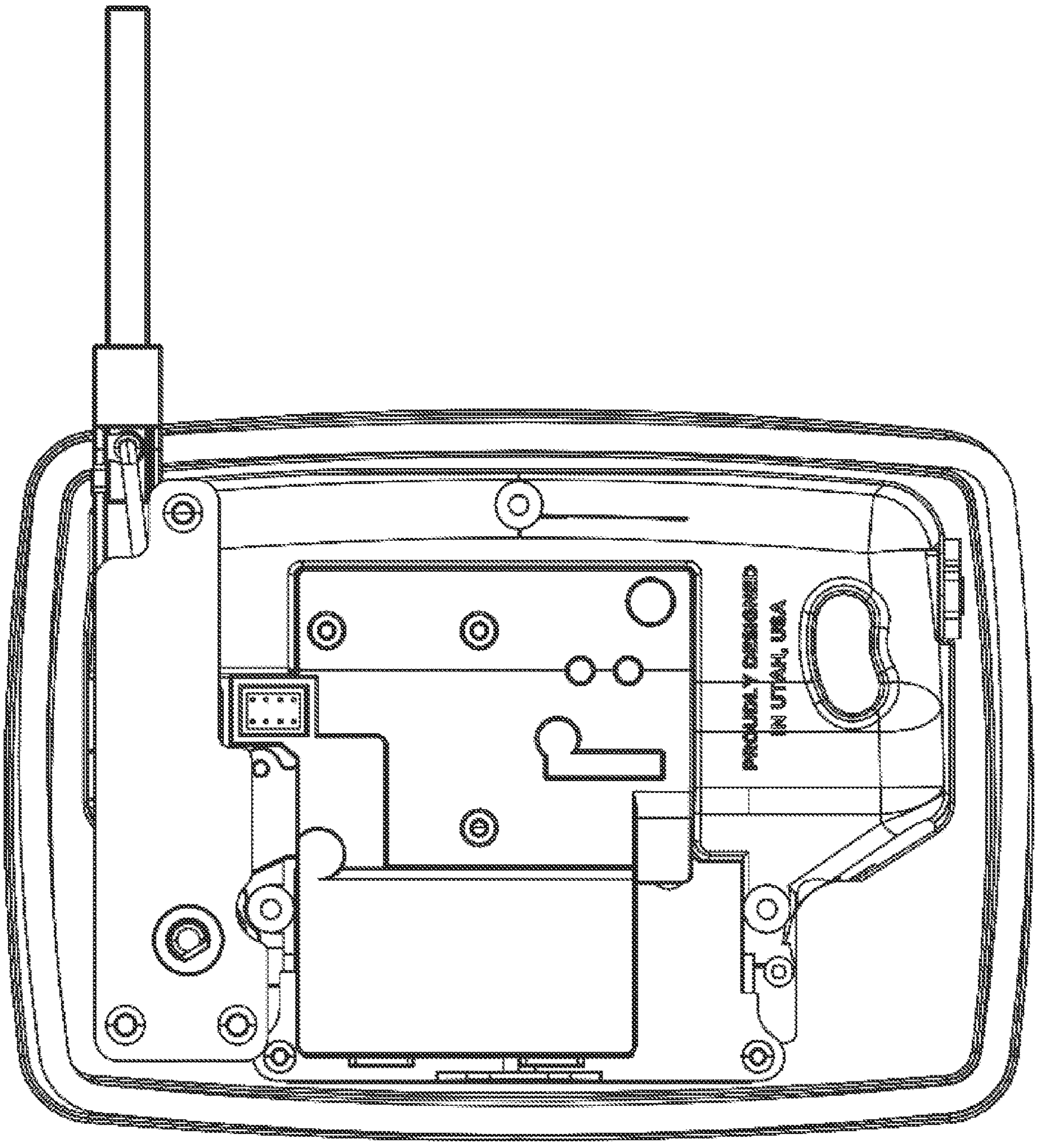
Figure 25:
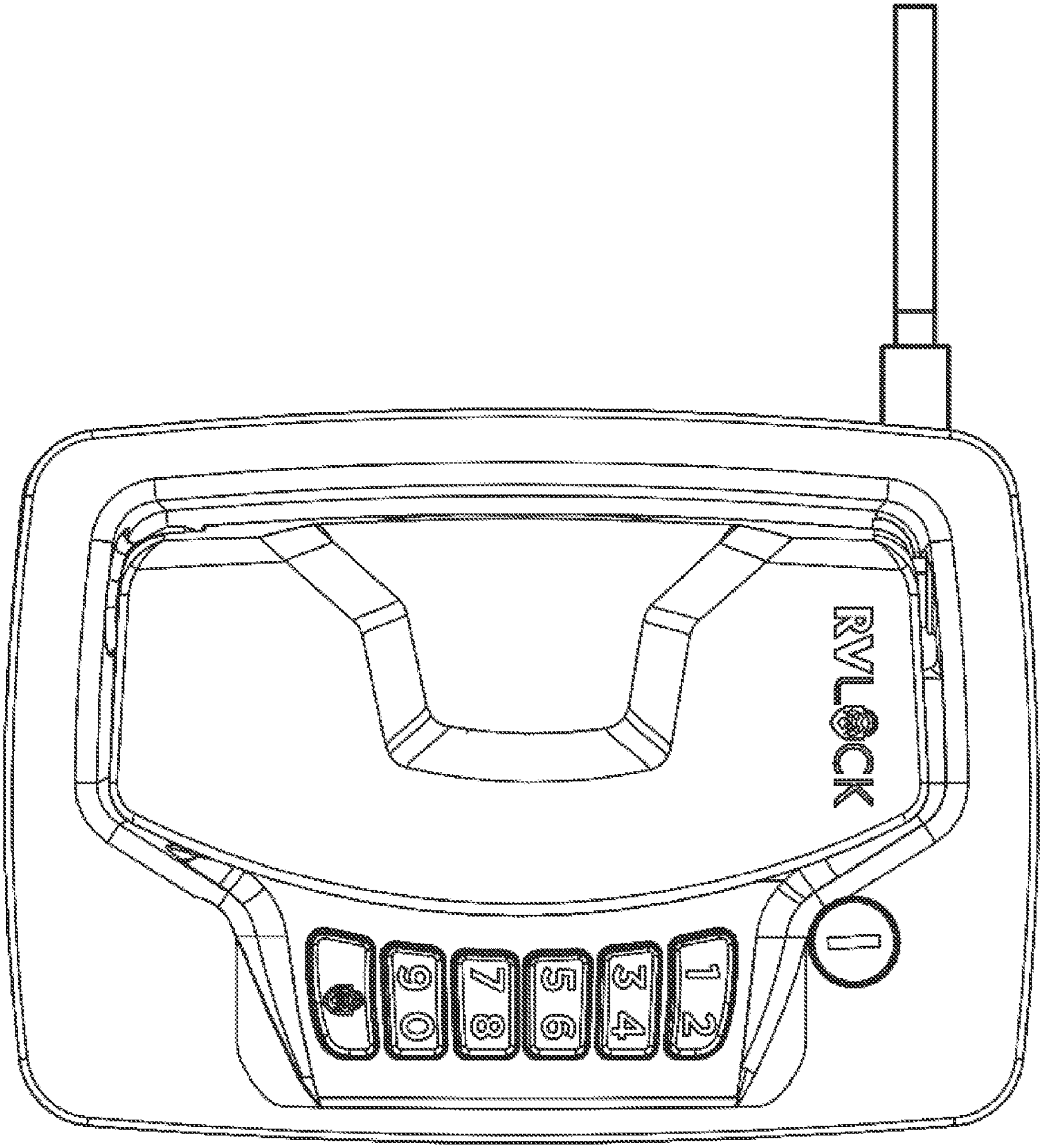
Figure 26:
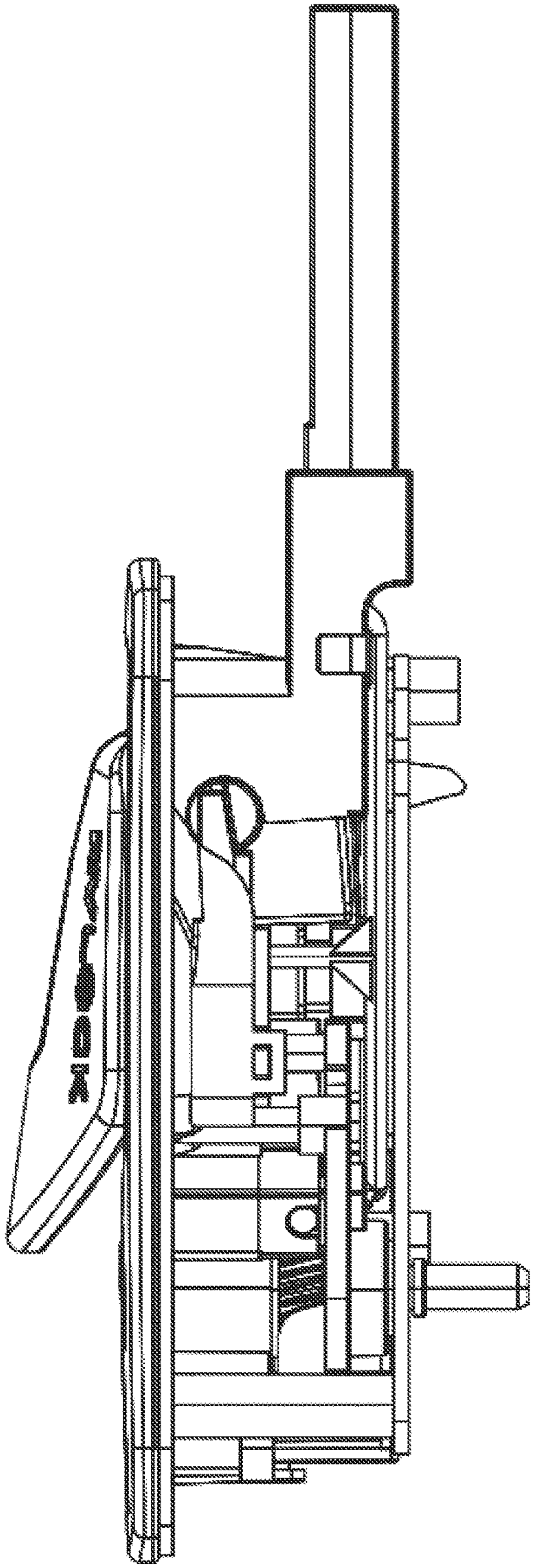
Figure 27:
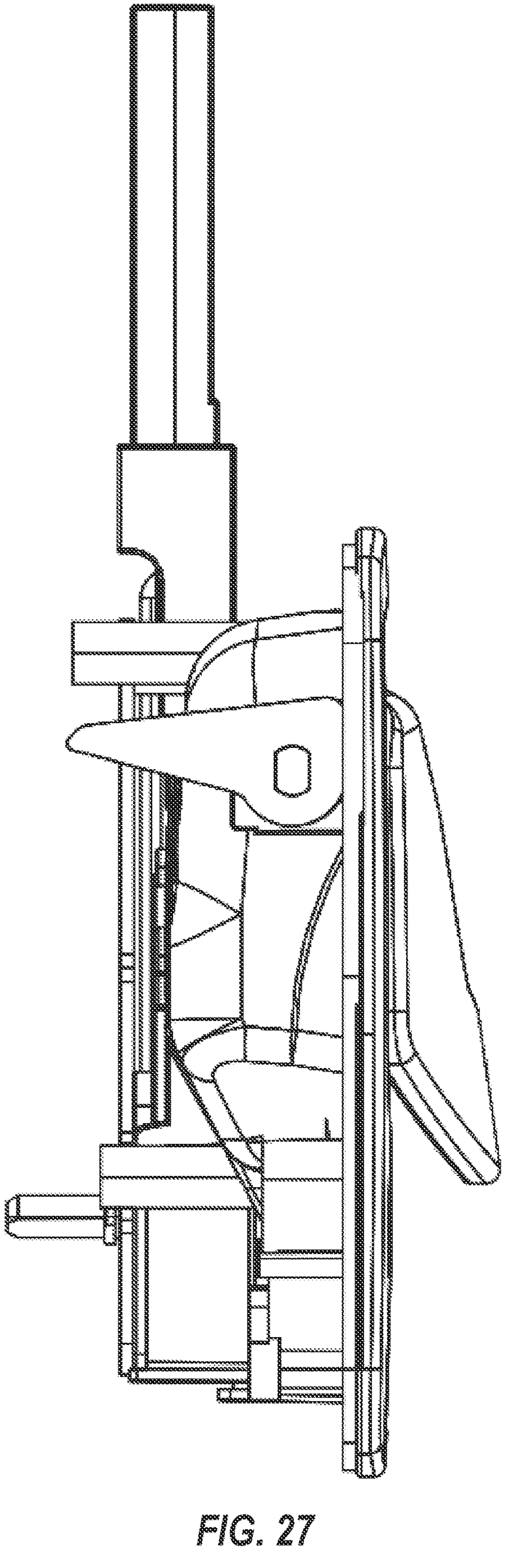
Figure 28:
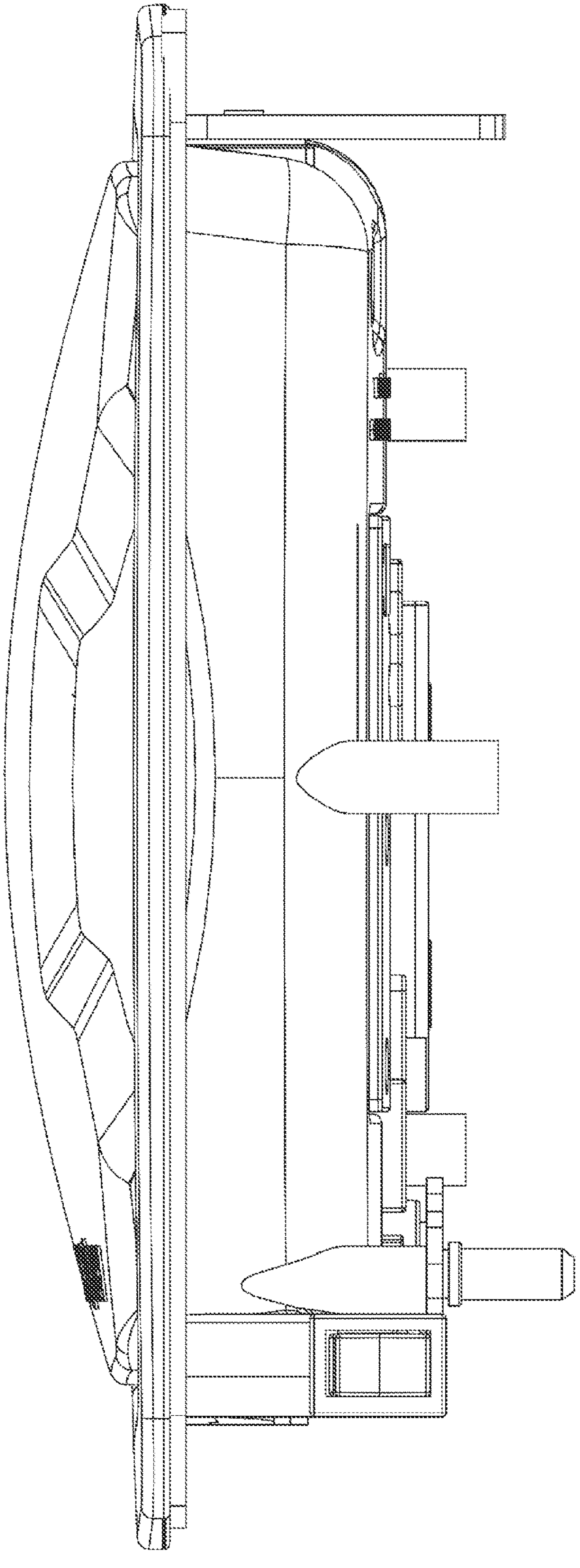

The removal slot 1454 permits selective removal or withdrawal of the deadbolt engagement member 1024 from engagement with the deadbolt 1040 (or from the deadbolt housing 1250 or guide slot 1252 generally, such as when no deadbolt is initially positioned within the deadbolt housing 1250). FIG. 15 shows the deadbolt engagement member 1024 withdrawn from the deadbolt 1040 through the removal slot 1454. For instance, a user may lift the deadbolt engagement member 1024 out of the guide slot 1252 through the removal slot 1454 when the deadbolt engagement member 1024 is aligned with the removal slot 1454 (as shown in FIG. 14). During removal of the deadbolt engagement member 1024 through removal slot 1454, the lock plate 1006 (see FIG. 10) may mitigate lateral movement of the linkage bar 1020 to prevent the handle locking engagement member 1022 from laterally withdrawing from the handle locking bolt 1030.

FIG. 15 also shows that the deadbolt 1040 comprises an engagement slot 1542 with openings on at least two surfaces of the deadbolt 1040 to enable the deadbolt engagement member 1024 to insert into or remove from the deadbolt at one surface (e.g., the top surface) and remain engaged with the deadbolt during locking/unlocking translations at another surface (e.g., a side surface).

With the deadbolt engagement member 1024 removed from the deadbolt 1040, the deadbolt 1040 may be withdrawn from the deadbolt housing 1250 to enable insertion of another deadbolt into the deadbolt housing 1250. FIG. 15 illustrates an alternative deadbolt 1560 that also includes an engagement slot 1562 with openings on at least two surfaces of the alternative deadbolt 1560, enabling the alternative deadbolt 1560 to be inserted into the deadbolt housing 1250 and receive the deadbolt engagement member 1024 through the removal slot 1454. As shown in FIG. 15, the alternative deadbolt 1560 comprises a different length than the deadbolt 1040. The exterior assembly 150 may thus accommodate different types/lengths of deadbolts, which may advantageously enable the door handle assembly 100 to function with different types of doors, frames, etc.

In the example of FIG. 15, the handle locking bolt plate 1034 includes a slot extension 1534 that receives the lateral extension 1222 of the handle lock engagement member 1022 during selective removal of the deadbolt engagement member 1024 through the removal slot 1454. The slot extension 1534 can allow the lateral extension 1222 to remain engaged with the handle locking bolt 1030 during modification of the deadbolt engaged with the deadbolt engagement member 1024.

Various components described hereinabove may be provided as a door handle kit that enables users to perform modifications if necessary to configure a door handle assembly for installation with their existing door and frame. For instance, a door handle kit may include components of at least (i) a door handle assembly (100, 150) with a lock actuator (1010), one or more linkage bars (1020), and a deadbolt housing (1250) that has a guide slot (1252) and removal slot (1454), (ii) a first deadbolt with a first length, and (iii) a second deadbolt with a second length.

In the example of FIGS. 10 through 15, a single linkage bar with multiple engagement members is utilized to facilitate simultaneous locking/unlocking of multiple locking modalities. However, other configurations are within the scope of the present disclosure, such as utilizing multiple different linkage bars for connecting to different locking bolts (e.g., multiple linkage bars actuatable by the same lock cam, such as via connection to different crank arms associated with the same lock cam, or via connection to one or more intermediate connection plates/housings).

Although examples provided herein have described certain components as being part of an interior assembly or an exterior assembly, the components described herein may be implemented on any part of a door handle assembly.

Although examples discussed herein have focused, in at least some respects, on door handle assemblies and components thereof in association with RV doors, the principles described herein may be applied in other domains, such as residential or office doors, vehicle doors, etc.

FIGS. 16 through 22 illustrate various views of an interior assembly (e.g., interior assembly 110) of a door handle assembly (e.g., door handle assembly 100). FIGS. 23 through 29 illustrate various views of an exterior assembly (e.g., exterior assembly 150) of a door handle assembly (e.g., door handle assembly 100). FIGS. 30 through 36 illustrate various views of locking components (e.g., lock cam 1112, crank arm 1114, linkage bar 1020, handle locking bolt plate 1034, handle locking bolt 1030, extension 1002, deadbolt 1040) of a door handle assembly (e.g., door handle assembly 100).

CONCLUSION

While certain embodiments of the present disclosure have been described in detail, with reference to specific configurations, parameters, components, elements, etcetera, the descriptions are illustrative and are not to be construed as limiting the scope of the claimed invention.

Furthermore, it should be understood that for any given element of component of a described embodiment, any of the possible alternatives listed for that element or component may generally be used individually or in combination with one another, unless implicitly or explicitly stated otherwise.

In addition, unless otherwise indicated, numbers expressing quantities, constituents, distances, or other measurements used in the specification and claims are to be understood as optionally being modified by the term "about" or its synonyms. When the terms "about," "approximately," "substantially," or the like are used in conjunction with a stated amount, value, or condition, it may be taken to mean an amount, value or condition that deviates by less than 20%, less than 10%, less than 5%, less than 1%, less than 0.1%, or less than 0.01% of the stated amount, value, or condition. At the very least, and not as an attempt to limit the application of the doctrine of equivalents to the scope of the claims, each numerical parameter should be construed in light of the number of reported significant digits and by applying ordinary rounding techniques.

Any headings and subheadings used herein are for organizational purposes only and are not meant to be used to limit the scope of the description or the claims.

It will also be noted that, as used in this specification and the appended claims, the singular forms "a," "an" and "the" do not exclude plural referents unless the context clearly dictates otherwise. Thus, for example, an embodiment referencing a singular referent (e.g., "widget") may also include two or more such referents.

It will also be appreciated that embodiments described herein may also include properties and/or features (e.g., ingredients, components, members, elements, parts, and/or portions) described in one or more separate embodiments and are not necessarily limited strictly to the features expressly described for that particular embodiment. Accordingly, the various features of a given embodiment can be combined with and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include such features.

What is claimed is:

1. A door handle assembly, comprising:

a handle; and a release plate in mechanical communication with the handle such that actuation of the handle causes rotation of the release plate, wherein the release plate defines a window configured to (i) receive a projection of a first type of trip lever of a first type of door latch assembly such that rotation of the release plate causes rotation of the first type of trip lever to facilitate rotation of a rotor of the first type of door latch assembly to a disengaged position and (ii) receive and secure a door linkage rod assembly comprising a linkage rod that is connectable to a second type of trip lever of a second type of door latch assembly such that rotation of the release plate causes actuation of the linkage rod to rotate the trip lever to facilitation rotation of a rotor of the second type of door latch assembly to a disengaged position, wherein the release plate comprises a plurality of engagement features configured for securing the door linkage rod assembly, the plurality of engagement features comprising at least a first engagement feature and a second engagement feature, wherein the first engagement feature and the second engagement feature are arranged on opposing sides of the window of the release plate.

2. The door handle assembly of claim 1, wherein the first engagement feature or the second engagement feature comprises a receiving arm, wherein the receiving arm comprises:

a first segment that extends from the release plate in a first direction; and a second segment that extends from the first segment in a second direction, wherein the receiving arm defines a receiving space configured to receive a securement member of a base of the door linkage rod assembly.

3. The door handle assembly of claim 1, wherein the first engagement feature or the second engagement feature comprises a hole configured to receive a bolt extending through a securement member of a base of the door linkage rod assembly.

4. The door handle assembly of claim 1, wherein a base body of a base of the door linkage rod assembly is configured to reside between sidewalls of the release plate that define the window when the window receives and secures the door linkage rod assembly.

5. The door handle assembly of claim 1, wherein the release plate further comprises a second window configured to receive a handle tooth of a second handle of the door handle assembly such that actuation of the second handle causes rotation of the release plate.

6. The door handle assembly of claim 5, wherein the handle comprises an interior handle on an interior face of the door handle assembly, and wherein the second handle comprises an exterior handle on an exterior face of the door handle assembly.

7. A door linkage rod assembly, comprising:

a linkage rod connectable to a trip lever of a door latch assembly of a door, wherein the linkage rod comprises threads on an end thereof; and a base comprising a base body, wherein the linkage rod is pivotally connected to the base via a pivot that is secured to the base body and defines a pivot axis for the linkage rod relative to the base, the base comprising a plurality of securement members configured for selective securement to and disengagement from engagement features of a release plate of a door handle assembly such that, when the linkage rod is connected to the trip lever and the plurality of securement members is selectively secured to the engagement features of the release plate, rotation of the release plate causes actuation of the linkage rod to rotate the trip lever to facilitate rotation of a rotor of the door latch assembly to a disengaged position.

8. The door linkage rod assembly of claim 7, wherein the base comprises a base body, wherein the linkage rod is pivotally connected to the base body, and wherein each of the plurality of securement members extend from the base body.

9. The door linkage rod assembly of claim 8, wherein the base body is configured to reside between sidewalls of the release plate that define a window proximate to the engagement features of the release plate when the plurality of securement members of the base engages with the engagement features of the release plate.

10. The door linkage rod assembly of claim 8, wherein the plurality of securement members comprises a first securement member and a second securement member, and wherein the first securement member and the second securement member extend from opposing sides of the base body.

11. The door linkage rod assembly of claim 10, wherein the first securement member comprises a securement arm that is planarly offset from the base body.

12. The door linkage rod assembly of claim 11, wherein the engagement features of the release plate comprise a receiving arm, and wherein the securement arm is configured to secure to the receiving arm.

13. The door linkage rod assembly of claim 12, wherein the securement arm comprises end protrusions configured to extend over opposing side edges of the receiving arm when the securement arm secures to the receiving arm.

14. The door linkage rod assembly of claim 10, wherein the second securement member comprises a bolt plate that is planarly offset from the base body.

15. The door linkage rod assembly of claim 14, wherein the bolt plate comprises a hole configured to receive a bolt to secure the base to the release plate.

16. The door linkage rod assembly of claim 7, wherein the base body defines a through hole, and wherein the pivot extends through the through hole.

17. A door handle kit, comprising:

a door linkage rod assembly, comprising:

a linkage rod connectable to a first type of trip lever of a first type of door latch assembly; and a base, wherein the linkage rod is pivotally connected to the base, the base comprising a plurality of securement members; and a door handle assembly, comprising:

a handle; and a release plate in mechanical communication with the handle such that actuation of the handle causes rotation of the release plate, wherein the release plate defines a window configured to (i) receive a projection of a second type of trip lever of a second type of door latch assembly such that rotation of the release plate causes rotation of the second type of trip lever to facilitate rotation of a rotor of the second type of door latch assembly to a disengaged position and (ii) receive and secure the base of the door linkage rod assembly such that rotation of the release plate causes actuation of the base and the linkage rod to rotate the first type of trip lever to facilitate rotation of a rotor of the first type of door latch assembly to a disengaged position.

18. The door handle kit of claim 17, wherein the release plate further comprises a second window configured to receive a handle tooth of a second handle of the door handle assembly such that actuation of the second handle causes rotation of the release plate.

19. The door handle kit of claim 18, wherein the handle comprises an interior handle on an interior face of the door handle assembly, and wherein the second handle comprises an exterior handle on an exterior face of the door handle assembly.

20. The door handle kit of claim 17, wherein the linkage rod comprises threads on an end thereof.

* * * * *